United States Patent
Ramaswamy et al.

(10) Patent No.: US 11,468,022 B2
(45) Date of Patent: *Oct. 11, 2022

(54) INTEGRATED DISPOSITION FOR FILE RETENTION MANAGEMENT

(71) Applicant: MICROSOFT TECHNOLOGY LICENSING, LLC, Redmond, WA (US)

(72) Inventors: Sanjay H. Ramaswamy, Sammamish, WA (US); Nakul Garg, Sammamish, WA (US); Kannan Dhanasekaran, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/110,241

(22) Filed: Dec. 2, 2020

(65) Prior Publication Data

US 2021/0081381 A1 Mar. 18, 2021

Related U.S. Application Data

(63) Continuation of application No. 15/936,342, filed on Mar. 26, 2018, now Pat. No. 10,860,554.

(51) Int. Cl.
*G06F 16/215* (2019.01)
*G06F 16/23* (2019.01)
(Continued)

(52) U.S. Cl.
CPC ............ *G06F 16/215* (2019.01); *G06F 16/23* (2019.01); *G06F 16/93* (2019.01); *G06Q 10/10* (2013.01)

(58) Field of Classification Search
CPC ........ G06F 16/215; G06F 16/23; G06F 16/93; G06Q 10/10
(Continued)

(56) References Cited

U.S. PATENT DOCUMENTS 8,386,533 B2 2/2013 Venkata
2007/0112866 A1* 5/2007 Olson-Williams ...... G06F 16/22
(Continued)

OTHER PUBLICATIONS

"Office Action Issued in European Patent Application No. 19714292.0", dated Jul. 15, 2022, 13 Pages.
(Continued)

*Primary Examiner* — Robert Stevens
(74) *Attorney, Agent, or Firm* — Han K. Gim; Newport IP, LLC

(57) ABSTRACT

An abstraction layer communicates with a plurality of applications executing on a multi-application platform. The abstraction exposes a standard interface for the plurality of applications to communicate content status information. An indication is received that a new content item will be generated. A record is generated that is immutably associated with the new content item. The record is updated with information received from the application associated with the content item, the information pertaining to a changed status of the content item. In response to a command to delete the content item, it is determined whether to confirm deletion of the content item based on one or more data retention policies. The record is updated to indicate a reason for granting or denying the deletion and a source of the delete command.

20 Claims, 10 Drawing Sheets

(51) Int. Cl.
*G06F 16/93* (2019.01)
*G06Q 10/10* (2012.01)

(58) Field of Classification Search
USPC .......................................................... 707/689
See application file for complete search history.

(56) References Cited

U.S. PATENT DOCUMENTS

2011/0023034 A1    1/2011   Nelson et al.
2012/0110039 A1*  5/2012   McKay .................. G06F 16/93
                                                                              707/822

OTHER PUBLICATIONS

"Office Action Issued in Indian Patent Application No. 202047035186", dated Jul. 19, 2022, 8 Pages.

* cited by examiner

INTEGRATED DISPOSITION FOR FILE RETENTION MANAGEMENT

PRIORITY APPLICATION

The present application is a continuation of, and claims priority to, co-pending U.S. patent application Ser. No. 15/936,342, filed Mar. 26, 2018, and entitled "Integrated Disposition for File Retention Management," which is herein incorporated by reference in its entirety.

BACKGROUND

Organizations and entities implement file retention policies to establish procedures for retaining information for operational or regulatory compliance purposes. For instance, an organization may develop a file retention policy to adhere to government regulations that require certain financial documents to be retained for at least a predefined minimum retention period. When implementing such a policy on a productivity platform such as an office suite, the various individual applications must provide a specific implementation to enable the policy to be affected in a way that interacts with each application of the productivity platform. The specific implementations are typically unique to each application and thus require multiple interfaces and a complex management infrastructure to log and maintain the retention policies.

For instance, an email platform for the office suite may require specific data content formats and interfaces, which may inhibit the ability to deploy retention policies across productivity platforms that have applications other than email platforms. In other words, it may be cumbersome or difficult to implement a retention policy that is configured for the conventional email platform's interfaces across a file hosting platform, an instant messaging platform, a video conferencing platform, etc. For businesses that want to implement a uniform and comprehensive retention policy for all data content across numerous applications on their productivity platforms, multiple and duplicative interfaces and functions may need to be implemented, resulting in complexity and redundant storage and management mechanisms. Furthermore, the disparate interfaces inhibit the creation and implementation of retention and disposition rules that can be applied across the entire platform. For instance, a conventional email platform may be configured to deploy one file retention rule to retain emails and log disposition of the emails, while a document editing application may a separate log for recording disposition of documents.

Some existing systems also have a number of shortcomings when it comes to accurate logging of events. For example, when a document policy indicates that a number of files should be deleted after period of time, most systems do not have a mechanism for providing accurate logging of such events particularly after a file has been deleted. Once the files deleted, associated log files and other records may also be purged. Thus, a system may never be able to provide an accurate history of activities.

It is with respect to these considerations and others that the disclosure made herein is presented.

SUMMARY

An integrated work platform is disclosed that enables users to efficiently manage the lifecycle of their data while implementing a defensible disposition scheme. Users typically need to retain and manage their data in accordance with compliance and regulatory requirements, including disposition of their data. A data content item may include, for example, documents, messages, and other items that are typically stored as files.

The integrated work platform is configured to provide a comprehensive view of data content items and their lifecycle according to compliance and regulatory requirements, based on an in-place data retention platform that provides auditing and other functions. The in-place data retention platform may be configured to provide capture, association, and consolidation of metadata for multiple compliance events, persistence of compliance event metadata, and display of compliance event history for extended durations of time.

The in-place data retention platform may allow users to immutably retain all data content that is created by the integrated work platform and immutably maintain and retain all metadata for the data content up to and subsequent to disposition of the data content. For users that must adhere to compliance and regulatory requirements, such a platform may provide a consolidated view on the changes, in particular compliance-related changes from the point of creation until its disposal.

Disposition of data content generally refers to the destruction of a content item, typically an item that has expired and otherwise does not need to be retained. Such data is typically in electronic form, and the disposal method may include deletion from the file system as well as active erasure of the electronic data from its storage location or transfer of the electronic data from its storage location. The appropriate method of disposal may be determined by the confidential or sensitive nature of the content.

The disposition of data content must itself adhere to compliance and regulatory requirements for data disposition, which may be referred to as defensible disposition. Defensible disposition may include logging and reporting of the metadata associated with disposal of a content item as well as additional functions of the in-place data retention platform. The in-place data retention platform may be configured to implement data classification and retention processes, which may provide the tools for a user or a user organization to ensure that only the data that is required for business and legal purposes is being kept, while other data may be defensibly disposed.

The in-place data retention platform can help reduce the risk profile of a user's data retention processes, efficiently capture characteristics of the user's data with regard to retention policies, and reduce the complexity and cost of searching and retrieving information for electronic discovery and other data intensive activities. The in-place data retention platform also alleviates the complexity and cost of obtaining retention data by providing a standard interface for multiple applications and platforms to provide retention and disposition metadata without having to resort to custom tooling. Furthermore, by reducing the redundant capturing of information, network bandwidth requirements can be reduced, storage capacity can be reserved for other purposes, and overall efficiency of the user platform can be improved.

In various embodiments, the in-place data retention platform may be configured to capture, associate, and consolidate metadata for multiple compliance events. Furthermore, the compliance event metadata may be persisted indefinitely or for a specified time duration. The in-place data retention platform may further provide interfaces that can provide data for rendering the display of compliance event history for extended durations of time. The in-place data retention platform may also provide extensibility features for on-going enhancements. The in-place data retention platform may further include an immutable history of dispositions of content as well as requested dispositions that were not granted.

It should be appreciated that, although described in relation to a system, the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1A:
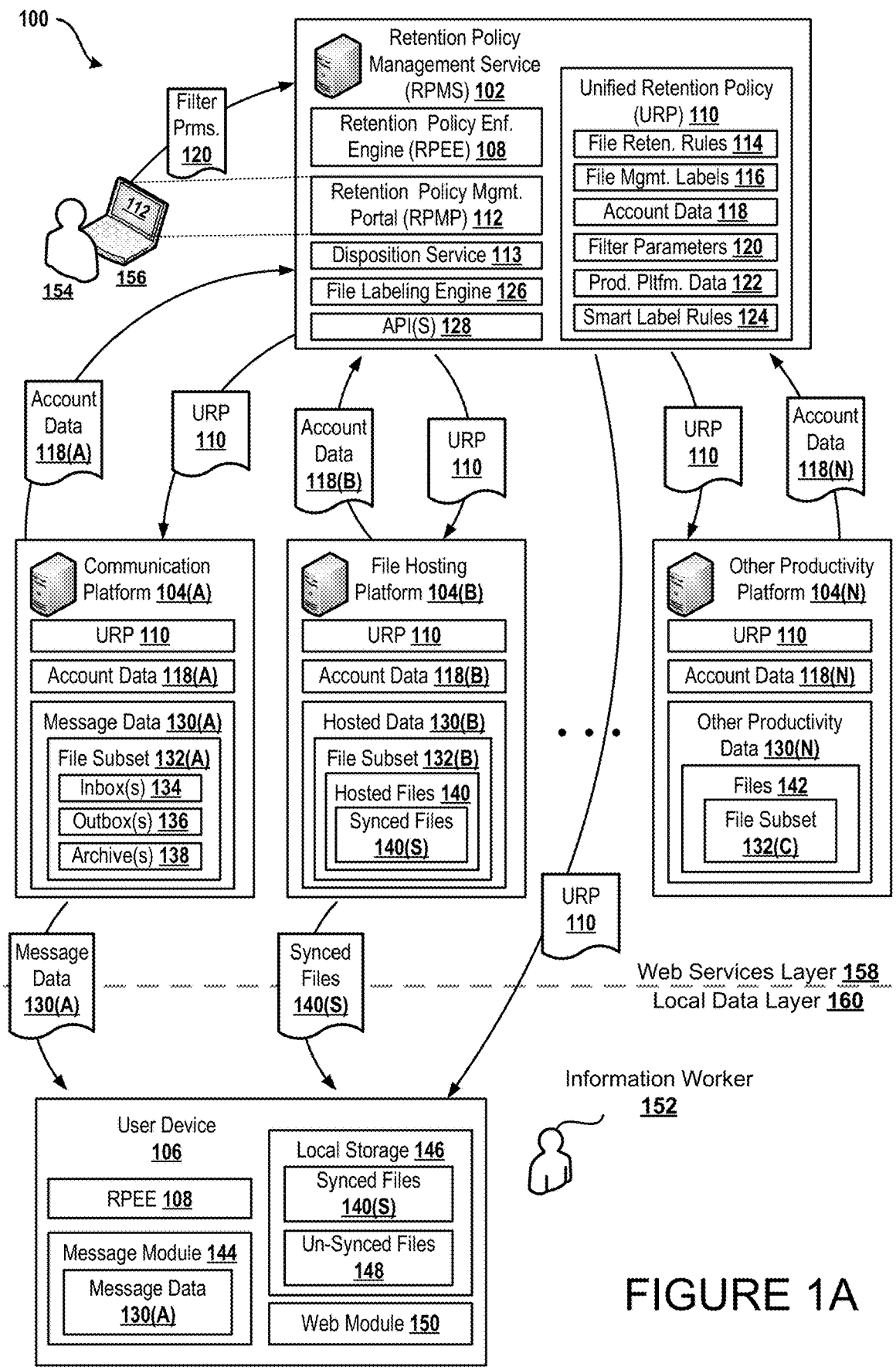
FIG. 1A illustrates an example data flow scenario of a system configured to implement an integrated retention policy in accordance with the present disclosure.

The following Detailed Description describes techniques for providing an in-place data retention platform that may operate in conjunction with an integrated file retention management system that implements a defensible disposition scheme. The in-place data retention platform provides benefits over conventional file retention management systems by, for example, capturing, consolidating, and persisting retention and disposition metadata across multiple productivity platforms.

As used herein, an "integrated retention policy" refers generally to a set of file retention rules that are configured to be deployed across multiple productivity platforms. An example integrated retention policy may include one or more file management labels and/or file retention rules that are configured according to a rule development scheme that is shared across various platforms of a productivity suite. An "integrated disposition platform" or "integrated disposition function" may refer to functionality that operates within or in conjunction with the in-place data retention platform to implement policies pertaining to defensible disposition schemes for data that is created and/or used by the various applications of the productivity suite. Defensible disposition may generally refer to disposal of data in a manner that includes evidence of adherence to regulatory, hold, and business retention requirements.

A productivity suite may include multiple productivity platforms (e.g. a communication platform providing email and/or chat capabilities, a file hosting platform providing cloud file storage capabilities, etc.). File management labels and/or file retention rules may be developed and managed that are "integrated" in the sense that individual file management labels and/or individual file retention rules can be selectively activated across multiple productivity platforms.

The file retention rules of the integrated retention policy may define one or more actions to be performed with respect to either all files or files that satisfy certain predefined conditions. The system may further be configured to deploy the integrated retention policy across the user selected productivity platforms by analyzing data corresponding to each selected productivity platform to identify files that satisfy the predefined conditions. The system may cause associated actions to be performed with respect to these files, or all files as the case may be.

Filter parameters may be selected for determining a subset of files, corresponding to the various productivity platforms, for selective activation of an individual file management label and/or an individual file retention rule. As used herein, the term "selective activation" may generally refer to making a particular file retention rule and/or a particular file management label available for use and/or enforcement with respect to a particular subset of files such as, for example, a set of files stored in association with a particular user account and/or group of user accounts.

Individual file management labels and/or file retention rules may be selectively activated with respect to the designated subset of files by applying the user-defined filter parameters to files stored in association with the user selected productivity platforms. In some instances, an individual file management label may be associated with both a file retention period, during which the system prevents deletion of files tagged with the file management label, and a file purge age at which the system automatically purges the particular file from productivity platform storage.

For example, upon receiving a request to delete the particular file during the file retention period, the system may deny the request or otherwise prevent the particular file from being deleted notwithstanding the request to delete the particular file. Then, the system may subsequently determine that the particular file has reached the file purge age and, based thereon, automatically purge the particular file from system storage. In some instances, an individual file retention rule (which may or may not correspond to an individual file management label) may be associated with both a file retention period and a file purge age.

Filter parameters may be selected for determining a subset of files on the communication platform and/or the file hosting platform and, ultimately, cause one or more file management labels and/or file retention rules to be selectively activated with respect to the designated subset of files. Example filter parameters include, but are not limited to, individual email accounts, groups of email accounts, individual users, and/or organizational groups that include multiple individual users.

An integrated retention policy may be prescribed to both the communication platform and the file hosting platform and to further limit activation of the integrated retention policy (and/or individual file management labels or file retention rules thereof) to a subset of these platforms' files based on the specified filter parameters. For example, a file management label may be selectively activated with respect to only a specific organizational group including a predefined group of user accounts.

In some embodiments, a retention policy management portal (RPMP) may be implemented that enables selective activation of file management labels and/or file retention rules of an integrated retention policy with respect to files that correspond to user defined filter parameters and, ultimately, to subsets of files across user selected productivity platforms. The RPMP enables a user to develop and/or manage aspects of an integrated retention policy that is configured to be deployed across multiple productivity platforms. For instance, the RPMP may enable a user to generate the integrated retention policy by developing individual file management labels and individual file retention rules and then selecting various productivity platforms to prescribe the integrated retention policy to. The RPMP may cause a computing device to display a graphical user interface (GUI) that includes various user interface elements (UIE) to enable a user to indicate filter parameters for determining a subset of files, corresponding to the various productivity platforms, for selective activation of an individual file management label and/or an individual file retention rule. The system may be configured to selectively activate individual file management labels and/or file retention rules with respect to the subset of files by applying the user-defined filter parameters to files stored in association with the user selected productivity platforms.

Users who implement data retention policies typically require extensive record keeping mechanisms that track all significant events in the lifecycle of a file. User also typically need to ensure that all disposition decisions are recorded. Whenever an item is disposed of, or whenever an attempt to delete an item is made and denied, a record of the disposition event or attempt needs to be persisted. A log of all such events and attempts should be create, updated, and maintained on a permanent basis or for an extended period of time as defined by the user or by regulatory requirements. In an embodiment, the history and disposition information for all content items of the productivity suite may be logged in this way regardless of whether the document is marked as a record or otherwise labeled for logging. The present disclosure provides a way to extend such logging to all data content items in a platform.

In an embodiment, for each type of data content item that is created, a record in a data retention log may be created that is not allowed to be deleted and whose access is limited and controlled. The record may include the retention policy and retention plan for the content item. Upon expiration of the retention time period for the content item, the content item may be set to automatically delete, or the content item may be set to require the manual intervention of an authorized user who determines whether the content item should be deleted.

By providing an integrated platform that enables retention and disposition data to be collected, updated, and persisted for all data content across one or more productivity platforms, users can reduce the need for manual intervention and logging for each individual application and data type. Furthermore, a comprehensive view of the logged retention and disposition data may be provided for the user.

In an embodiment, a process for determining a disposition process may be triggered by an attempted purge of a content item. Purging may variously refer to deletion, erasing, or otherwise making any or all of a content item inaccessible to one or more users.

In particular, a standardized abstracted interface may be provided that allows for various individual applications to provide metadata for data content items for their respective applications in a standardized way. Furthermore, new applications that are configured to communicate via this standard interface may be able to integrate into the disposition platform without a custom interface.

In a typical shared workspace platform, copies of the original data content item are maintained, and thus a separate system to keep the original is not needed in order to keep it immutable. In some embodiments, the integrated disposition platform may be configured to extract information from each application or service. The information may be extracted periodically or on-demand, and can be initiated by the integrated disposition platform, by the individual application, or by some other function in the shared workspace platform. For example, new content items may be reported, along with when the item was created. The information may be provided in response to a query form the integrated disposition platform. In other embodiments, the information may be provided from the application that created the content item without being prompted by the integrated disposition platform.

In some embodiments, only changes in status of a content item may be sent, which can reduce network bandwidth. In some embodiments, the integrated disposition platform may implement additional functionality to maintain defensible disposition processes, including but not limited to litigation hold and case-based hold, and intelligent classification of data based on forms, content, and context. Rather than providing logging disposition data for data content that are marked as records or that have gone through a disposition review, all data content may be logged to maintain history and disposition data.

In an embodiment, the integrated disposition platform may log disposition data for all content items including items marked as records, any data covered by a retention schedule via labels or policies, and all data that is disposed. The retention window may be configurable, for example to 15 years or other time period.

In one embodiment, a completed dispositions record may provide one or more of the following data categories: item, title, label, deletion authorized by, deleted date, created by, created date, last modified by, last modified date, last labelled by, last labelled date, last label definition (this describes the label properties as follows type of label, such as keep and delete, keep, review and delete, etc., retention duration, such as 7 years), is record (true/false), retention policy definition (the retention policy that governs the item as follows: name of policy, type of policy, such as keep and delete, etc., retention duration, such as 7 years), and case-based holds (case-based hold activity on the item as follows: case name, case start date, case end date, case owner). Sources may be identified by identifiers such as the SMTP address. The integrated disposition platform may be configured to allow searches and filtering across the data categories.

In one embodiment, the integrated disposition platform may allow users to view history when content is undergoing disposal or at other times. In an embodiment, the historical view can be retained for a configurable time period, such as 15 years. In an embodiment, the integrated disposition platform may be configured to collect disposition history information that are associated with different systems in an organization and provide a single integrated view.

In an embodiment, a database partition may be reserved for each client that is configured to store data retention compliance information. In some embodiments, record labels may be automatically created for each data content item. The user may also tag data content items for manual review. The database partitions may include sub-folders that are based on the labels. The sub-folders may grant permissions to specific users that can have access to these labels.

In an embodiment, the integrated disposition platform may invoke a compliance service for an audit record for a selected user. The compliance service may identify audit mailboxes for the user and instantiate an audit partition item lookup state cache. The contents of a search folder in the audit partition may be searched and the data may be read from the audit partition. Once the data is read, an application programming interface (API) may be called to write the audit record of interest to a compliance partition. Furthermore, various components may log the results of processing each record. This log may be provided to an analysis function and made available via other interfaces for further analysis as needed. Additionally, these logs may be used to perform outlier analysis. The log data may be secured from unauthorized access. Access to log will typically only be available to designated individuals (for example, records managers or disposition officers) within an organization with appropriate permissions. Furthermore, access may be scoped to specific departments/regions/subsidiaries/etc. When access is authorized, the log data may be searchable, sortable, and exportable.

Figure 1B:
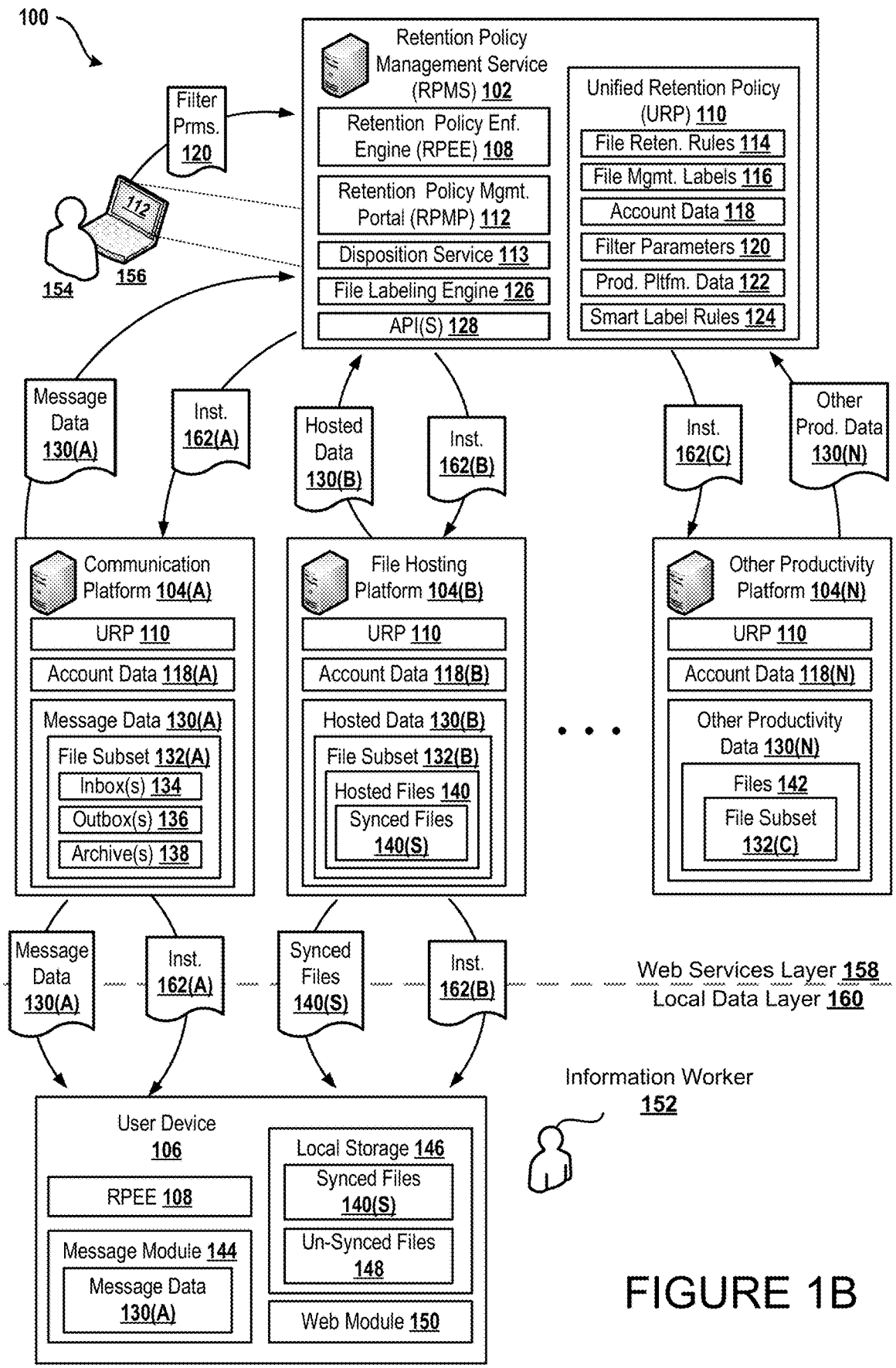
FIG. 1B illustrates an example data flow scenario of a system configured to implement an integrated retention policy in accordance with the present disclosure.
Figure 1C:
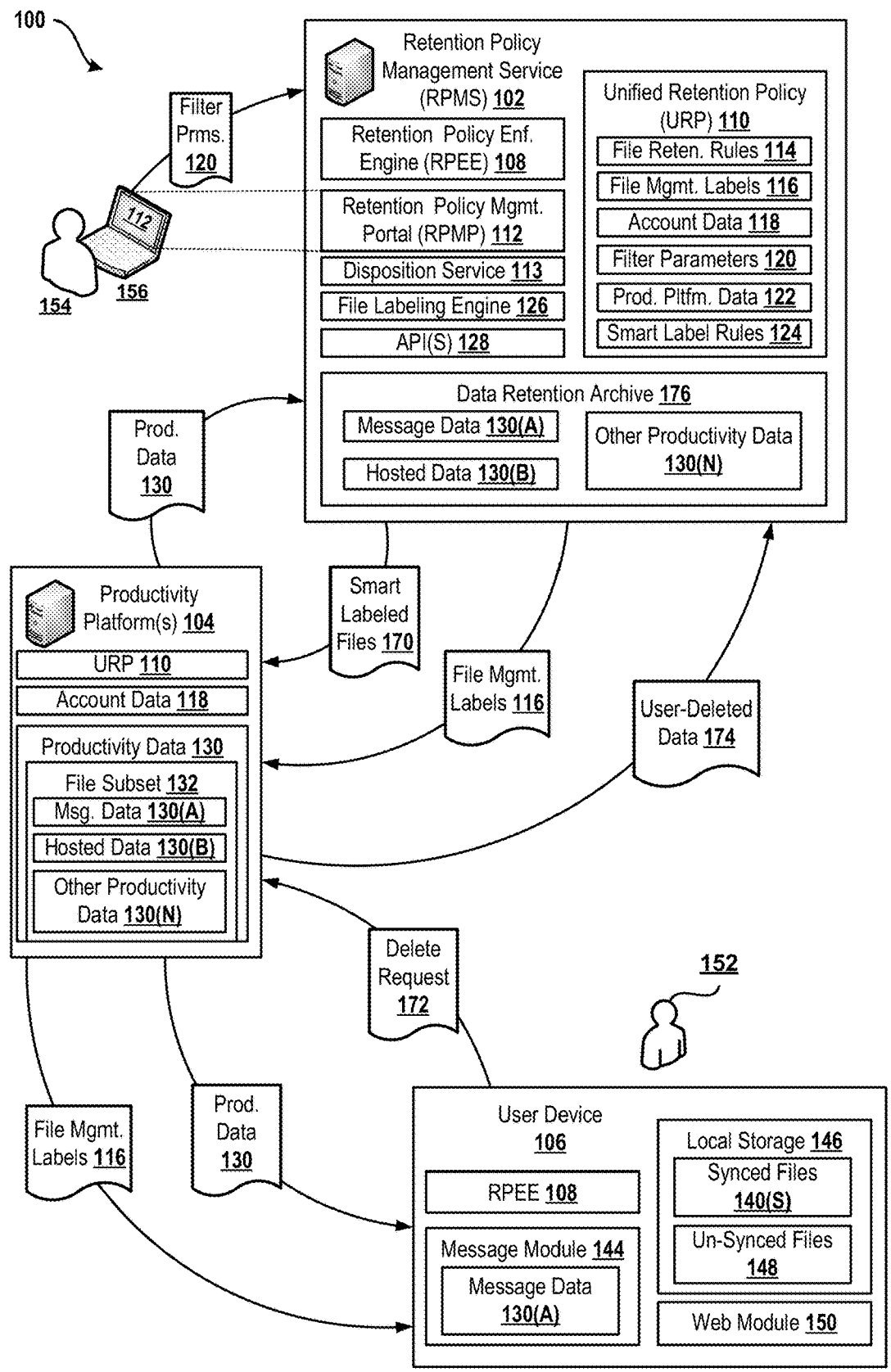
FIG. 1C illustrates an example data flow scenario of a system configured to implement an integrated retention policy in accordance with the present disclosure.

To illustrate aspects of the techniques disclosed herein: FIGS. 1A-1B illustrate various data flow scenarios of systems configured to implement an integrated retention policy including an integrated disposition platform across multiple productivity platforms; and FIG. 1C illustrates a data flow scenario of a system that automatically analyzes labels and metadata of files stored in association with one or more productivity platforms.

Similar to other illustrations described herein, it can be appreciated that operations and/or functionalities may be described according to a logical flow of data between various components. The order in which these operations and/or functionalities are described and/or illustrated herein is not intended to be construed as a limitation. Rather, any number of the operations and/or functionalities described with respect to any one of FIGS. 1A-1C, may be combined in any order and/or in parallel in accordance with the present disclosure. Other processes and/or operations and/or functionalities described throughout this disclosure shall be interpreted accordingly.

Turning to FIG. 1A, an example data flow scenario is illustrated with respect to a system 100 that activates an integrated retention policy to files across multiple productivity platforms by leveraging retention policy enforcement capabilities that are built into individual ones of the multiple productivity platforms. As used herein, the term "productivity platform" refers to local and/or web-based software that is dedicated to producing, modifying, and/or accessing information such as, for example, email, live chat sessions, word processing documents, presentations, workbooks (a.k.a. "worksheets"), and/or Internet/Intranet share sites.

Example productivity platforms include, but are not limited to, communication platforms (e.g. email services, instant messaging services, on-line video chat services, etc.) and file hosting platforms (e.g. personal cloud-based storage, online file sharing services). Furthermore, in some implementations, the individual productivity platforms may be components of a productivity suite (e.g. GOOGLE G-SUITE, ZOHO Office Suite, or MICROSOFT OFFICE 365) such that a single set of user credentials may be issued to provision a user with access to a plurality of different productivity platforms.

As illustrated, the system 100 may include a retention policy management service 102 that may transmit an integrated retention policy to multiple productivity platforms 104. The system 100 may further include a user device 106 through which an information worker may access the multiple productivity platforms 104. As illustrated in FIG. 1A, example productivity platforms may include, but are not limited to, a communication platform 104(A), a file hosting platform 104(B), and any other type of productivity platform 104(N). In some instances, the file hosting platform 104(B) may be configured to enable a user to open, view, edit, create, save, copy, or otherwise manipulate files such as, for example, text documents, spreadsheet documents, and/or presentation documents. Example file hosting platforms include, but are not limited to, MICROSOFT WORD ONLINE, MICROSOFT EXCEL ONLINE, MICROSOFT POWERPOINT ONLINE, MICROSOFT ONEDRIVE, GOOGLE DOCS, GOOGLE SHEETS, GOOGLE SLIDES, and/or GOOGLE DRIVE.

The retention policy management service 102 may include a retention policy enforcement engine (RPEE) 108 that is configured to enforce an integrated retention policy (URP) 110 to files across one or more of the productivity platforms 104. The retention policy management service 102 may be configured to expose a retention policy management portal (RPMP) 112 to enable an administrator to input filter parameters to prescribe the integrated retention policy 110 to individual ones of the productivity platforms 104 and/or individual user accounts. The retention policy management service 102 may include a disposition service 113 that may incorporate some or all of the functionality associated with the integrated disposition platform or integrated disposition function as disclosed herein. For example, disposition service 113 may provide functionality that operates within or in conjunction with RPMP 112 to implement policies pertaining to defensible disposition schemes for data that is created and/or used by the various applications of the productivity suite.

The integrated retention policy 110 may include, but is not limited to, file retention rules 114 that define various actions to be performed with respect to files that satisfy one or more predefined conditions and/or are tagged with one or more file management labels 116 in accordance with the integrated retention policy 110. In some instances, an individual file management label 116 may be associated with one or more file retention rules 114 to cause the system to perform actions with respect to tagged files. For example, the integrated retention policy 110 may include a "Tax Record Policy" file retention rule 114 that expressly prescribes a retention age threshold for files that are determined to be tax related. Furthermore, a "Tax Record" file management label may be associated with the "Tax Record" file retention rule to cause this rule to be performed with respect to files that are tagged with the "Tax Record" file management label. The retention policy enforcement engine 108 may enforce the integrated retention policy 110 across the communication platform 104(A) and the file hosting platform 104(B) by identifying (and/or causing the communication platform 104(A) and the file hosting platform 104(B) to identify) tax related documents. The system 100 may then automatically purge these documents from data storage associated with the productivity platforms 104 as individual ones of the tax related documents reach the retention age threshold.

The integrated retention policy 110 may further include account data 118 that is associated with productivity platform user accounts assigned to individual and/or groups of information workers. For example, the organization may provision information workers with access to one or more of the productivity platforms 104 by assigning the information workers with unique credentials that can be used to sign-into associated productivity platform user accounts. In some instances, the account data 118 may indicate one or more predefined organizational groups that include a plurality of productivity platform user accounts. For example, as will be discussed in more detail with relation to FIG. 2, the account data 118 may indicate various organizational groups that may be associated with an organizational hierarchy.

In some instances, the RPMP 112 may enable an administrator to indicate filter parameters 120 for selectively activating file retention rules 114 and/or file management labels 116 with respect to one or more subsets of files. For example, the RPMP 112 may enable an administrator to indicate filter parameters 120 to prescribe a file management label 116 to both the communication platform 104(A) and the file hosting platform 104(B). The filter parameters 120 may further cause the system 100 to analyze a plurality of files stored in association with the communication platform 104(A) and the file hosting platform 104(B) to identify a subset of files based on the filter parameters 120.

In some instances, the filter parameters 120 may instruct the system 100 to prescribe aspects of the integrated retention policy 110 across multiple productivity platforms but to selectively activate these aspects of the integrated retention policy 110 with respect to some but not all of the files stored in association with these multiple productivity platforms. For example, the filter parameters 120 may instruct the system 100 to prescribe a file retention rule across multiple platforms but to selectively activate the file retention rule with respect to an individual user account and/or a predetermined organizational group.

The integrated retention policy 110 may further include productivity platform data 122 that is associated with individual ones of the multiple productivity platforms 104. In some implementations, the system 100 may obtain productivity platform data corresponding to each of the communication platform 104(A) and the file hosting platform 104(B). Example productivity platform data includes, but is not limited to, computer readable instructions that enable the system to navigate an organizational scheme of the productivity platforms and/or analyze different data file types that are associated with various productivity platforms. For example, the productivity platform data may inform the system of an organizational scheme used by a productivity platform to store productivity data such as, for example, emails and word processing documents. As another example, the productivity platform data may enable the system to read, modify, and/or analyze an email file type (e.g. a Personal Storage Table file and/or an HTML email file) that is associated with the communication platform as well as a word processing file type (e.g. an Office Open XML Document) and/or a spreadsheet file type (e.g. an Office Open XML Workbook) that is associated with the file hosting platform. The system may further determine an integrated retention policy that associates one or more actions (e.g. deleting a file) with various predefined conditions (e.g. the file meeting or exceeding a retention age threshold and/or a file purge age). The system may also expose the RPMP to enable a user to prescribe the integrated retention policy to both the communication platform and the file hosting platform.

The integrated retention policy 110 may further include smart label rules 124 to enable a file labeling engine 126 to analyze files stored in association with the productivity platforms 104 and, ultimately, to automatically label individual files without manual input from an information worker. For example, the file labeling engine 126 may be configured to analyze files with respect to one or more conditions defined by a particular smart label rule 124 and, ultimately, to automatically tag individual files that satisfy the one or more conditions with a corresponding label. As a more specific example, suppose that a "Tax Record" smart label rule 124 is configured to identify tax related files and then to tag these tax related files with a "Tax Record" file management label. The "Tax Record" smart label rule 124 may include a condition associated with one or more predetermined keywords for the file labeling engine 126 to search for in a file header. For example, the file labeling engine 126 may identify files including the term "IRS Form" within a one inch margin from the top of the page and tag files that satisfy this condition with the "Tax Record" file management label.

The retention policy management service 102 may further include one or more application programming interfaces (API) 128 that expose a standardized and abstracted interface through which the retention policy management service 102 can send data to and/or receive data from the productivity platforms 104 and/or the user device 106 regardless of the specific implementations of each application executing in the productivity platforms 104. Through the use of this data interface and other interfaces, the devices and services described herein can communicate and process data in such a manner as to enable the functionality and/or operations disclosed herein. The standardized and abstracted interface may be configured to translate commands and other data being passed through the API 128 to enable the applications of the productivity platforms 104 to send and receive data and commands pertaining to data management, retention, and disposition using standardized calls. The API 128 may convert calls to intermediate commands and data before they are sent to other functions of the retention policy management service 102. Additionally, individual applications running on the productivity platforms 104 may translate received commands and data to intermediate stages that may be implementation specific to the individual applications. Using the above described techniques, the retention policy management service 102 need not be concerned with the particular applications running on the productivity platforms 104 with regard to collection of metadata for logging compliance information. For example, in one situation a document editing application and a spreadsheet application may both provide compliance data to the retention policy management service 102 as long as the applications adhere to the same set of API interfaces.

The productivity platforms 104 may include productivity data 130 that includes a plurality of files that are scattered across the productivity platforms 104 and which are potentially subject to one or more retention rules 114 of the integrated retention policy 110. For example, the communication platform 104(A) may include message data 130(A) associated with an email or other type of communication account whereas the file hosting platform 104(B) may include hosted data 130(B) corresponding to a cloud storage drive. Individual files of the plurality of files of the productivity data 130 may include one or more characteristics that can be exploited to parse the productivity data 130 into one or more file subsets 132.

For example, the filter parameters 120 may be set to cause the system 100 to parse the productivity data 130 into a file subset 132 that includes files that are stored in association with user accounts included in a predetermined organizational group. For example, the filter parameters 120 may cause the system 100 to parse the productivity data 130 to identify a file subset that corresponds only to a tax group. For purposes of the present discussion, assume that the communication platform 104(A) includes message data 130(A) corresponding to one or more email inboxes 134, one or more email outboxes 136, and/or one or more archive folders 138. Further assume that the file hosting platform 104(B) includes hosted data 130(B) corresponding to one or more hosted files 140 which may include one or more synced files 140(S) (e.g. files that are synchronized between the user device 106 and a productivity platform 104), and that the other productivity platform 104(N) includes other productivity data 130(N) including one or more files 142 that are also potentially subject to the integrated retention policy 110.

The user device 106 may also include the retention policy enforcement engine 108 (or a version thereof) that is configured to enforce the integrated retention policy 110 with respect to portions of the productivity data 130 that are stored locally at the user device 106. For example, the retention policy enforcement engine 108 may be configured to access a message module 144 to analyze locally stored portions of the message data 130(A), and also to access local storage 146 of the user device 106 to analyze the synced files 130(S) and/or the plurality of un-synced files 148 (e.g. files that are stored locally on the user device 106 and are not synchronized with a productivity platform 104). The user device 106 may further include a web module 150 through which an information worker 152 can access individual ones of the productivity platforms 104. For example, one or more of the productivity platforms 104 may include a web-based portal through which the information worker 152 can provide her organization assigned user credentials to obtain access to the productivity data 130 that is associated with her account.

With respect to the example data flow scenario of FIG. 1A, the retention policy management service 102 is shown to obtain account data 118 corresponding to user accounts that are provisioned with access to the productivity platforms 104. In some implementations, various portions of the account data 118 may correspond to individual productivity platforms 104. For example, the account data 118 may be comprised of account data 118(A) that corresponds to the communication platform 104(A), account data 118(B) that corresponds to the file hosting platform 104(B), and so on. Example account data includes, but is not limited to, user credentials associated with the information worker 152, and account settings corresponding to a user account of the information worker 152. In some implementations, the account data 118(A) and the account data 118(B) may share similar user credentials data while having at least partially divergent account settings data.

For example, the same user credentials may provision the information worker 152 with access to each of the communication platform 104(A) and the file hosting platform 104(B) but the information worker 152 may have customized her account settings with respect to one or both of the communication platform 104(A) and the file hosting platform 104(B). Although as illustrated, the retention policy management service 102 is shown to receive the account data 118(A)-118(N) from the corresponding productivity platforms 104(A)-104(N), it can be appreciated that the account data 118 may be obtained from alternate sources such as, for example, an administrative database.

The retention policy management service 102 may expose the RPMP 112 to enable a retention policy administrator 154 to view and/or modify the integrated retention policy 110 in general and/or as related to specific user accounts. For example, the RPMP 112 may be configured to cause a computing device 156 to display various aspects of the integrated retention policy 110 such as, for example, the file retention rules 114, the account data 118, and/or the productivity platform data 122.

The RPMP 112 may further be configured to enable the retention policy administrator 154 to create new and/or modify existing file retention rules 114. Through the RPMP 112, the retention policy administrator 154 may define a particular file retention rule that includes at least one condition and at least one action to be performed with respect to files that satisfy the at least one condition. Example conditions include, but are not limited to: reaching and/or exceeding a file purge age as measured from a date of creation of a particular file; reaching and/or exceeding a file purge age as measured from a date that a particular file was last modified; reaching and/or exceeding a retention age threshold as measured from a date of creation or a date a file was last modified; an age of the file being within a file retention period; being manually tagged by a user with a label (e.g. a "Tax Record" label indicating that a particular file is tax related); and/or being automatically tagged by the system 100 with a label. Example actions to be performed with respect to files that satisfy one or more conditions include, but are not limited to, forcibly retaining a particular file within system storage (e.g. preventing a user from deleting the file), moving a particular file to an archive, purging a particular file from system storage, preventing a particular file from being displayed to the information worker 152 via one or more of the productivity platforms 104, preventing a particular file from being modified by the information worker 152, and/or prompting a user (e.g. the retention policy administrator 154 and/or the information worker 152) to indicate whether to retain and/or purge a particular file.

Example file retention rules include, but are not limited to, automatically purging a particular file from storage associated with the productivity platforms 104 based on the particular file reaching or exceeding a file purge age and/or retention age threshold, forcibly retaining a particular file in storage associated with the productivity platforms 104 (and/or a data retention archive) based on the particular file not reaching the retention age threshold and/or the file age being within the file retention period, and/or prompting a user to adjudicate whether to delete or retain a particular file upon that file reaching a retention age threshold.

In some implementations, a file retention rule may be associated with a purge review age to cause the system 100 to prompt a human review such as, for example, the information worker 152 to indicate whether to purge individual files as these files reach the purge review age. For example, the system 100 may identify one or more files that have reached the purge review age and, based thereon, trigger a human reviewer to indicate whether the one or more files are to be purged.

In some implementations, a particular file retention rule may be associated with both a file purge age as well as a purge review age that is less than or equal to the file purge age. As a more specific, but nonlimiting example, an individual file retention rule may be associated with a file purge age of nine years and a purge review age of eight years and eleven months. Under these circumstances, the system may determine that an individual file has reached the purge review age once that file reaches eight years and eleven months of age and, ultimately, the system 100 may prompt a human to indicate whether to purge the individual file upon that individual file reaching the file purge age of nine years. Furthermore, in some implementations, the system will refrain from automatically purging individual files in the absence of a user indication to do so. Stated alternatively, in some implementations, automatically purging individual files may be contingent upon an indication from a human reviewer that purging these individual files is appropriate. The ability to purge a file will typically only be available to designated individuals (for example, records managers or disposition officers) within an organization with appropriate permissions. Furthermore, access may be scoped to specific departments/regions/subsidiaries/etc.

In some implementations, the system may be configured to determine a user access frequency for particular files that are associated with a file management label and have reached a file purge age. For example, the system may determine that a particular file that has reached its file purge age has been accessed within a predetermined threshold of time (e.g. has been accessed within the last one day, one week, one month, one year, etc.) and, based on this determination, the system may prevent individual files from being automatically purged from system storage. Accordingly, the system may intelligently prevent files that are still being frequently accessed from being automatically purged.

The RPMP 112 may enable the retention policy administrator 154 to indicate the filter parameters 120 and to cause the computing device 156 to transmit the filter parameters 120 to the retention policy management service 102. The filter parameters 120 may enable the system 100 to determine one or more file subsets 132, of the productivity data 130, for selective activation of one or more file management labels 116 and/or file retention rules 114. For example, although the message data 130(A) may include hundreds or even thousands of individual email accounts, the retention policy administrator 154 may indicate filter parameters 120 that cause the system 100 to selectively activate a "Tax Record" file management label with respect to only those email accounts held by members of a "Tax Group" within a finance department but not with respect to any other predefined organizational groups.

Under these circumstances, the file subset 132(A) may correspond to email messages (and electronic attachments thereof) that are stored within inboxes 134, outboxes 136, and email archives 138 of the "Tax Group" members. Furthermore, just as some filter parameters 120 may indicate which files of the productivity data 130 should be included in the one or more file subsets 132, other filter parameters 120 may indicate which files of the productivity data 130 should be excluded from the one or more file subsets 132.

For example, the filter parameters 120 may include a parameter that indicates inclusion of all files stored in association with a predetermined organizational group's user accounts (all of the "Tax Group's" emails), and another parameter that indicates exclusion of files stored in association with one or more expressly defined members of this predetermined organizational group.

In various instances, the filter parameters 120 may also enable the retention policy administrator 154 to prescribe the integrated retention policy 110 across multiple ones of the productivity platforms 104. For example, the filter parameters 120 may cause the retention policy management service 102 to transmit the integrated retention policy 110 to a plurality of user-selected productivity platforms 104. Ultimately, the filter parameters 120 may cause one or more aspects of the integrated retention policy 110 to be deployed (e.g. enforced) at each user-selected productivity platform 104. Although as illustrated, the retention policy management service 102 is shown to transmit the integrated retention policy 110 to each of the communication platform 104(A), the file hosting platform 104(B), and the other productivity platform 104(N), in some implementations the RPMP 112 may enable the retention policy administrator 154 to prescribe the integrated retention policy 110 to some but not all of the productivity platforms 104. For example, in some implementations, the retention policy administrator 154 may utilize the RPMP 112 to indicate filter parameters 120 to prescribe the integrated retention policy 110 across multiple ones of the productivity platforms 104 while excluding one or more individual productivity platforms 104 from all or part of the integrated retention policy 110. For example, via the RPMP 112, the retention policy administrator 154 may modify filter parameters 120 to prescribe the integrated retention policy 110 to all productivity platforms 104 by default, while further modifying the filter parameters 120 to override the default by excluding selected ones of the productivity platforms 104.

In some implementations, default parameters of the integrated retention policy 110 may prescribe the integrated retention policy 110 to a predefined subset of the productivity platforms 104. For example, an organization may elect that a particular form of communication be transitory and, therefore, elect not to save messages transmitted via this particular form of communication. To illustrate, suppose that the communication platform 104(A) corresponds to an email service (e.g. MICROSOFT OUTLOOK, GMAIL, etc.) and the other productivity platform 104(N) corresponds to a video conferencing service (e.g. SKYPE, GOOGLE HANGOUTS). Here, an organization may elect to deploy the integrated retention policy with respect to the email service but refrain from retaining any communications associated with the video conferencing service. Under these circumstances, the organization may set parameters of the system 100 that by default prescribe the integrated retention policy 110 to the email service while excluding the video conferencing service from the integrated retention policy 110.

In some implementations, the RPMP 112 may also enable the retention policy administrator 154 to indicate filter parameters 120 that selectively prescribe the integrated retention policy 110, in whole or in part, to user accounts on an individual and/or group basis. For example, a version of the integrated retention policy 110 may be created with respect to an accounting team of an organization and the RPMP 112 may enable the retention policy administrator 154 to seamlessly prescribe this version of the integrated retention policy 110 to the accounting team as a whole rather than having to select each individual member of the accounting team. As another example, the retention policy administrator 154 may generate one or more file retention rules 114 to be uniquely prescribed to one or more user accounts on an individual basis. As a more specific, but nonlimiting example, the integrated retention policy 110 may by default cause all tax related files to be automatically purged from the system 100 across all of the productivity platforms 104 upon these tax related files reaching a predetermined file purge age. However, the retention policy administrator 154 may modify the default system parameters with respect to one or more specific information workers (e.g. an executive level organization employee such as a Chief Financial Officer) to prompt a user to adjudicate whether to delete or retain any of this specific information worker's tax related files that reach the file purge age.

In some implementations, the RPMP 112 may enable the retention policy administrator 154 to selectively exclude individual communication platform user accounts from a portion of the integrated retention policy 110 and/or the entire integrated retention policy 110. For example, the system 100 may obtain organization account data that corresponds to user accounts that are provisioned by the organization with access to two or more productivity platforms. To illustrate, suppose that the organization account data includes information associated with a particular user account that is provisioned by the organization with access to the communication platform 104(A) and the file hosting platform 104(B). In other words, the particular user is provisioned with two accounts (which may share common user credentials) where account "A" corresponds to the communication platform 104(A) and account "B" corresponds to the file hosting platform 104(B). Under these circumstances, the RPMP 112 may enable the retention policy administrator 154 to generate filter parameters 120 to select either account "A" or account "B" (or both for that matter) to be excluded in whole or in part from the integrated retention policy. Then, based on the retention policy administrator's selected account exclusions, the system 100 may exclude account "A" and/or account "B" from the integrated retention policy 110.

Based on the filter parameters 120 defined by the retention policy administrator 154 via the RPMP 112, the system 100 may deploy the integrated retention policy 110 across one or more of the productivity platforms 104. For example, in the implementation illustrated in FIG. 1A, the retention policy management service 102 is shown to transmit the integrated retention policy 110 to individual productivity platforms 104 to cause the individual productivity platforms to enforce the integrated retention policy 110. For example, the system 100 may leverage retention policy enforcement capabilities that are built into individual ones of the multiple productivity platforms 104. Under these circumstances, the system 100 may automatically modify retention policy settings of the individual productivity platforms 104 based on the integrated retention policy 110.

For example, the system 100 may transmit user-defined filter parameters 120 associated with the communication platform 104(A) to the communication platform 104(A) and also transmit user-defined filter parameters 120 associated with the file hosting platform 104(B) to the file hosting platform 104(B). Based on those filter parameters 120 that correspond to each individual productivity platform 104, these individual productivity platforms may analyze corresponding productivity data 130 based on the filter parameters 120 to identify a corresponding file subset 132. Then, the individual productivity platforms 104 may each analyze its corresponding file subset 132 to identify files that satisfy various conditions of the integrated retention policy 110 and, in particular, individual file retention rules 114 thereof. Once the individual productivity platforms 104 identify files, within the file subset 132, that satisfy conditions of the integrated retention policy 110, these individual productivity platforms 104 may then perform actions corresponding to applicable ones of the file retention rules 114.

To further illustrate these concepts, in the implementation illustrated in FIG. 1A, the communication platform 104(A) may analyze the message data 130(A) based on the filter parameters 120 to identify those emails that correspond to the file subset 132(A) and the file hosting platform 104(B) may analyze the hosted data 130(B) based on the filter parameters 120 to identify one or more document and/or workbook files that correspond to the file subset 132(B), and so on. For example, suppose that the filter parameters 120 are set to cause the system 100 to selectively activate a "Tax Record Policy" file retention rule 114 with respect to the "Tax Group's" user accounts. Under these circumstances, the filter parameters 120 may cause the communication platform 104(A) to selectively activate the "Tax Record Policy" file retention rule 114 with respect to the "Tax Group's" email files, e.g. file subset 132(A), and further cause the file hosting platform 104(B) to selectively activate the "Tax Record Policy" file retention rule 114 with respect to the "Tax Group's" cloud-based file storage accounts (e.g. MICROSOFT ONEDRIVE and/or GOOGLE DRIVE accounts), e.g. file subset 132(B). Then, once the filter parameters 120 have been used to identify the file subsets 132, the individual productivity platforms 104 may analyze these file subsets 132 to identify one or more files that satisfy conditions corresponding to one or more file retention rules 114 and/or smart label rules 124. For example, the communication platform 104(A) may analyze the file subset 132(A) to identify one or more email files that satisfy conditions corresponding to the "Tax Record Policy" file retention rule 114, the file hosting platform 104(B) may analyze the file subset 132(B) to identify one or more document and/or workbook files that satisfy conditions corresponding to the "Tax Record Policy" file retention rule 114, and so on. Then, the communication platform 104(A) may perform a corresponding action with respect to the one or more email files that satisfy conditions of the "Tax Record Policy" file retention rule 114, and the file hosting platform 104(B) may likewise perform this action with respect to the one or more document and/or workbook files that satisfy the conditions of the "Tax Record Policy" file retention rule 114.

As further illustrated in FIG. 1A, in some implementations, the integrated retention policy 110 may be transmitted to the user device 106 to cause a local version of the retention policy enforcement engine 108 to enforce the integrated retention policy 110 with respect to the message module 144 and/or the local storage 146. Although the user device 106 may include a web module 150 that can be used to access the productivity platforms 104 (e.g. by providing her credentials to the productivity platforms via a web browser), the user device 106 may also be configured to periodically synchronize local data with one or more of the communication platforms. For example, the message module 144 may be a local email client (MICROSOFT'S OUTLOOK, APPLE'S IOS MAIL) that is configured to provide non-web-based access to the information worker's user account for the communication platform 104(A). Accordingly, the message module 144 may store at least some of the message data 130(A) locally at the user device 106.

Furthermore, the local storage 146 may be configured to periodically receive the synchronized files 140(S) from the file hosting platform 104(B) to enable the information worker 152 to access these synchronized files 140(S) without having to use the web module 150 to access the file hosting platform 104(B) via the web services layer 158. Accordingly, to mitigate a risk that enforcement of the integrated retention policy 110 will be limited to the web services layer 158 while files that are subject to one or more retention rules 114 are mishandled locally at the user device 106, the local version of the retention policy enforcement engine 108 may be configured to locally enforce the integrated retention policy 110 by analyzing any locally stored message data 130(A) and/or locally stored synchronized files 140(S). Various implementations of the system 100, therefore, may be configured to enforce the integrated retention policy 110 both at a web services layer 158 (e.g. retaining and/or deleting files from one or more servers corresponding to the productivity platforms 104) as well as at a local data layer 160 (e.g. retaining and/or deleting files from a hard drive and/or cache of the user device 106).

In some implementations, the local version of the retention policy enforcement engine 108 may further be configured to analyze the unsynchronized files 148 on the local storage 146 to identify individual files that are subject to one or more file retention rules 114 and, ultimately, to enforce the integrated retention policy 110 with respect to even these unsynchronized files 148. For example, the information worker 152 may utilize a portable storage device such as, for example, a USB drive to move some of the hosted files 140 (or any other organization data for that matter) to the local storage 146. Furthermore, these hosted files 140 may have been labeled automatically by the system 100 and/or manually by the information worker 152 as being tax related files. Under these circumstances, the system 100 may identify one or more of the unsynchronized files 148 that are affected by a particular file retention rule 114 and then perform a corresponding action with respect to these identified files.

In some implementations, the system 100 may selectively transmit the integrated retention policy 110 only to user devices 106 that correspond to the one or more file subsets 132. For example, in a scenario in which the filter parameters 120 indicate a selective activation of the "Tax Record Policy" file retention rule 114 with respect to the "Tax Group," the system 100 may identify the user devices 106 associated with the "Tax Group" and may selectively transmit a "Tax Record Policy" file retention rule 114 to these user devices. Accordingly, the local version of the retention policy enforcement engine 108 and/or the message module 144 may receive only those file retention rules that are applicable to files stored on the particular user device 106.

Turning now to FIG. 1B, an example data flow scenario is illustrated where the system 100 selectively activates the integrated retention policy 110 by causing the retention policy management service 102 to analyze data received from the productivity platforms 104 and then instruct the individual productivity platforms 104 to perform actions in accordance with the retention policy 110. It can be appreciated that the data flow scenario of FIG. 1A has much in common with the data flow scenario of FIG. 1B and, therefore, for brevity such similarities need not be discussed in detail with respect to FIG. 1B. For example, in each data flow scenario the system 100 may expose the RPMP 112 via the device 156 to enable the retention policy administrator 154 to indicate filter parameters 120 for selectively activating file retention rules 114 and/or file management labels 116 with respect to one or more subsets of files across one or more productivity platforms 104.

For example, the RPMP 112 may enable an administrator to indicate filter parameters 120 to prescribe a file management label 116 to both the communication platform 104(A) and the file hosting platform 104(B) with respect to file subsets 132 that correspond to a predetermined organizational group. Furthermore, individual ones of the productivity platforms 104 such as, for example, the communication platform 104(A) and the file hosting platform 104(B) may be configured to communicate with the user device 106. For example, the communication platform 104(A) may be configured to communicate with and/or transmit the message data 130(A) to the message module (inbox) 134.

It can also be appreciated that there are several differences between these data flow scenarios. In particular, in the example dataflow scenario of FIG. 1B, individual productivity platforms 104 transmit productivity data 130 to the retention policy management service 102 and, based thereon, receive from the retention policy management service 102 instructions 162 indicating actions to perform with respect to various portions of the transmitted data. For example, the communication platform 104(A) is shown to transmit the message data 130(A) to the retention policy management service 102. As described above, the message data 130(A) may correspond to the information worker 152's email inbox(s) 134, email outbox(s) 136, and/or archive folder(s) 138. Upon receipt of the message data 130(A), the retention policy enforcement engine 108 may analyze the message data 130(A) with respect to the filter parameters 120 to identify the file subset 132(A). Then, the retention policy enforcement engine 108 may analyze individual files of the file subset 132(A) with respect to the integrated retention policy 110 to identify a plurality of files (e.g. email files and/or other files that are included in an email file as an attachment) that satisfy the condition(s) of individual file retention rules 114. Similarly, the file hosting platform 104(B) is shown to transmit the hosted data 130(B) to the retention policy management service 102, which then may analyze the hosted data 130(B) to identify another plurality of files of the file subset 132(B) that satisfy various conditions of the file retention rules 114.

Upon identifying one or more sets of files that are subject to various ones of the file retention rules 114, the retention policy management service 102 may then transmit instructions 162 to the individual productivity platforms 104 to cause actions corresponding to the various ones of the file retention rules 114 to be performed with respect to the one or more sets of files. For example, the retention policy enforcement engine 108 may analyze the message data 130(A) to determine the file subset 132(A) and, ultimately, to identify a plurality of emails that are included within the file subset 132(A) and that have reached or exceeded a predefined file purge age. The retention policy enforcement engine 108 may further analyze the hosted data 130(B) to determine the file subset 132(B) and, ultimately, to identify a plurality of word processing documents and/or spreadsheet workbooks that are included within the file subset 132(B) and that have also reached or exceeded the predefined file purge age. Then, the retention policy enforcement engine 108 may transmit an instruction 162(A) to cause the communication platform 104(A) to purge the plurality of emails from the message data 130(A) while also transmitting an instruction 162(B) to cause the file hosting platform 104(B) to purge the plurality of word processing documents and/or spreadsheet workbooks from the hosted data 130(B).

In some implementations, individual productivity platforms 104 may be configured to transmit a subset of files, from their corresponding data, to the retention policy management service 102 based on certain events occurring with respect to individual ones of the subset of files. For example, upon the information worker 152 attempting to delete a particular message from her inbox 134, the communication platform 104(A) may be configured to transmit this particular message to the retention policy management service 102 and then wait to receive an instruction 162(A) before deleting the particular message. Then, in the event that the instruction 162(A) indicates that the information worker 152 is permitted to delete this particular message based on the integrated retention policy 110, the communication platform 104(A) may permanently delete the particular message. On the other hand, in the event that the instruction 162(A) indicates that the information worker 152 is not permitted to delete this particular message, the communication platform 104(A) may retain the particular message and/or transmit the particular message to an archive.

In some implementations, the system 100 may further be configured so that individual productivity platforms 104 relay instructions 162 to the local version of the retention policy enforcement engine 108 at the user device 106 to enforce the integrated retention policy 110 at the local data layer 160. For example, the instruction 162(A) may be transmitted to the user device 106 to cause the message module 144 to delete messages that have reached or exceeded a predefined file purge age and/or retention age threshold. In various implementations, the local version of the retention policy enforcement engine 108 may be configured to scan the local storage 146 to identify locally stored copies of files corresponding to a particular instruction 162. For example, consider a scenario where the information worker 152 has used a local email client to manually drag an email message from the message module 144 to a non-synchronized folder contained within the local storage 146. Further suppose that the message module 144 lacks the capabilities to identify and/or perform actions with respect to the email message that has been copied to the local storage 146. Under these circumstances, the retention policy enforcement engine 108 may be configured to scan the local storage 146 to locate this email message in the local storage 146 and, ultimately, to cause the email message to be purged from the local storage 146 upon the message having reached or exceeded the predefined file purge age.

Turning now to FIG. 1C, an example data flow scenario is illustrated where the system 100 deploys the file labeling engine 126 to provide the file management labels 116 to the productivity platforms 104 and/or the user device 106. In some implementations, the file management labels 116 include one or more labels that may be displayed at the user device 106 to enable the information worker 152 to manually tag individual files of the productivity data 130 with individual ones of the one or more labels. For example, the information worker 152 may review email messages within the message data 130(A) and manually apply a "Tax Record" label to an individual email message.

In some implementations, the information worker 152 may access the productivity platforms 104 via the web module 150 and manually tag individual files with the labels via a web portal user interface. That is, the information worker 152 may manually tag the individual files while accessing an online version of a productivity platform 104. In some implementations, the file management labels 116 may be transmitted to the user device 106 to enable the information worker 152 to manually tag individual files with the labels locally at the user device 106. For example, the message module 144 may be an email client (e.g. MICROSOFT OUTLOOK) that, upon receipt of the file management labels 116, enables the information worker 152 to locally label individual email messages. In some implementations, the message module 144 may be configured to synchronize with the productivity platform 104 to cause labels placed on individual files via the message module 144 to also be placed on those files within the productivity data 130 as stored at the productivity platform 104. For example, based on these techniques, a file labeled as "Tax Record" within the message module 144 would eventually be synchronized with the productivity platform 104 such that it is also file labeled as "Tax Record" when viewed via a web-based version of the productivity platform 104.

In some implementations, the file management labels 116 include a plurality of sets of labels and the RPMP 112 is configured to enable the retention policy administrator 154 to selectively cause individual sets of labels to be displayed on an individual user basis and/or a user group basis. For example, in various implementations, the RPMP 112 may enable the retention policy administrator 154 to define a set of accounting related labels as well as a set of legal related labels and, ultimately, to selectively activate the set of accounting related labels with respect to members of an accounting team and also to selectively activate the set of legal related labels with respect to members of a legal team. For example, the selective activation may cause the set of accounting related labels to be displayed to members of the accounting team and also cause the set of legal related labels to be displayed to the members of the legal team. Accordingly, the retention policy administrator 154 can prevent the information worker 152 from having to sift through large numbers of file management labels which are irrelevant to her work responsibilities while still providing her access to those labels which are potentially relevant to files she is performing work with so that she may manually tag individual files as appropriate.

In some implementations, the system 100 is configured to analyze the productivity data 130 with respect to smart label rules 124 to automatically label individual files without manual input from the information worker 152. For example, the file labeling engine 126 may be configured to receive the productivity data 130 and analyze individual files within the productivity data 130 with respect to the smart label rules 124 to determine whether any individual files satisfy one or more of the smart label rules 124. Example smart label rules 124 include, but are not limited to, rules that search for individual files that contain one or more predefined types of sensitive information, positively match a user-defined search query, correspond to a predefined document fingerprint, or any combination thereof. Then, once the system 100 has identified individual files that satisfy one or more smart label rules 124, the system 100 may automatically apply corresponding labels to the individual files to define smart labeled files 170 that may then be transmitted to the productivity platforms 104. In some implementations, a particular file that has been labeled as a smart labeled file may be displayed to the information worker 152 along with an indication that this particular file has been automatically labeled according to one or more of the smart label rules 124.

For example, suppose that the productivity data 130 that is sent to the file labeling engine 126 contains an individual email that includes an IRS tax form as an attachment. Further suppose that an individual smart label rule 124 has been designed by the retention policy administrator 154 to identify IRS tax forms and to label these forms (and/or communications containing these forms such as the email of the present scenario) with a "Tax Record" label. Under these circumstances, the system 100 may identify that this individual email includes the IRS tax form and, based thereon, the system may apply the "Tax Record" label to this individual email. In some implementations, individual files that are manually labeled or automatically label based on one or more smart label rules 124 may be displayed to the user along with an indication that such files have been labeled. For example, with particular reference to FIGS. 6A-6B, in each of GUI 600 and GUI 604 the third email down from the top is displayed to the user as being labeled with the "Tax Record" file management label.

In some implementations, the system 100 may be configured to analyze data corresponding to a delete request 172 to determine whether a particular file that the information worker 152 is attempting to delete satisfies one or more conditions associated with a particular file retention rule 114. For example, upon the user attempting to delete a particular email, the system 100 may analyze this particular email to identify that it satisfies the conditions associated with a "Tax Record" file retention rule. Then, based on having identified the particular email as a tax record, the system may prevent this file from being modified and/or deleted according to the integrated retention policy 110. For example, the integrated retention policy 110 may indicate to the information worker 152 that tax records are to be retained until they reach a retention age threshold or at least be retained for a file retention period. In some implementations, a particular file retention rule may indicate that individual files that satisfy certain conditions are restricted from being modified.

For example, the "Tax Record" file retention rule may define one or more conditions under which individual files must be retained and/or deleted and/or restricted from being modified. In some implementations, a particular file retention rule may also have a particular file management label associated therewith to cause the system 100 to automatically label individual files with the particular file management label based on a determination that the particular file retention rule applies to the individual files. For example, the integrated retention policy 110 may associate the "Tax Record" file retention rule with a "Tax Record" file management label to cause the system 100 to automatically label individual files that satisfy the "Tax Record" rule as being tax records. In some implementations, the integrated retention policy 110 may further indicate that individual files are restricted from being modified once they are labeled as tax records. Under these circumstances, upon receiving the delete request 172 indicating that the information worker 152 has attempted to delete a particular file that is labeled as a tax record, the system 100 may prevent the particular file from being deleted (or modified for that matter) until the particular file reaches its corresponding predefined retention age threshold at which time the system 100 may automatically purge this particular file from the system 100 storage.

In some implementations, the system 100 may be configured to enable the information worker 152 to delete the particular file with respect to her productivity platform account but also to transfer the particular file, as user deleted data 174, to a data retention archive 176 in order to abide by the integrated retention policy 110. Based on these techniques, the system 100 may give to the information worker 152 an appearance that a particular data file has been deleted even though that file has been archived for retention purposes. It can be appreciated that these techniques will benefit the information worker 152 by allowing her to organize (and/or decrease an amount of file-based clutter of) her productivity data 130. These techniques may further benefit the information worker when productivity platforms 104 have corresponding storage allotments assigned thereto for individual user accounts. For example, the information worker 152 may be assigned an email account that is provisioned with a limited storage allotment of, for example, a predefined number of megabytes. By permitting the information worker 152 to delete particular files from her account even when those files are subject to the integrated retention policy 110, the system 100 mitigates difficulties associated with the information worker 152 running out of available storage within her storage allotment without impacting an organization's ability to abide by the integrated retention policy 110.

Figure 2:
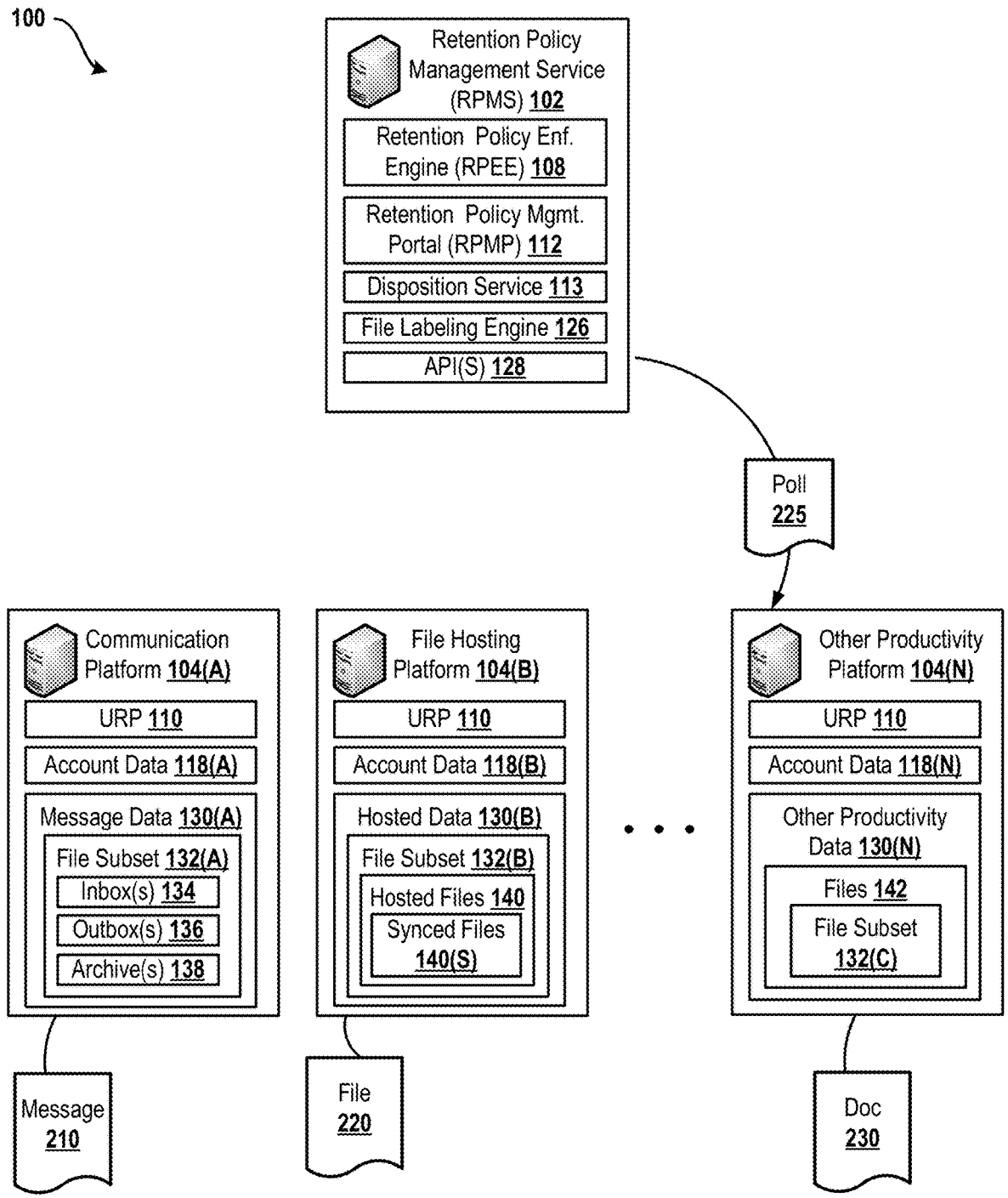
FIG. 2 illustrates an example data flow scenario of a system configured to implement an integrated retention policy in accordance with the present disclosure.

FIG. 2 illustrates an example data flow scenario of the system 100 obtaining metadata pertaining to data content items and maintaining a data retention log. FIG. 2 illustrates retention policy management service 102 sending a poll 225 to the productivity platform 104N which has stored a document 230 associated with an application running on productivity platform 104N. The poll 225 may include a request for a status of document 230 which has previously been logged as having been created on productivity platform 104N.

Figure 3:
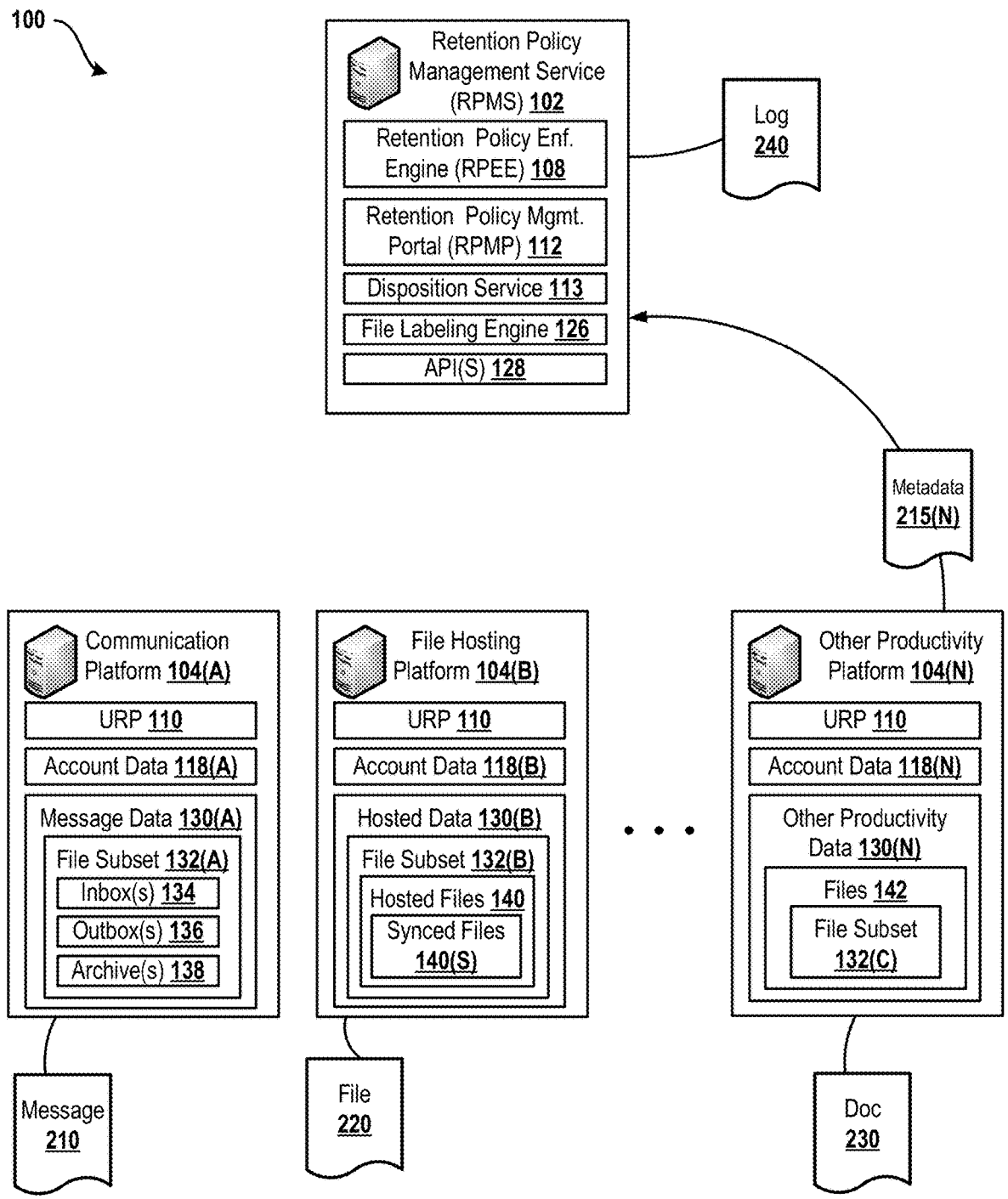
FIG. 3 illustrates an example data flow scenario of a system configured to implement an integrated retention policy in accordance with the present disclosure.
Figure 4:
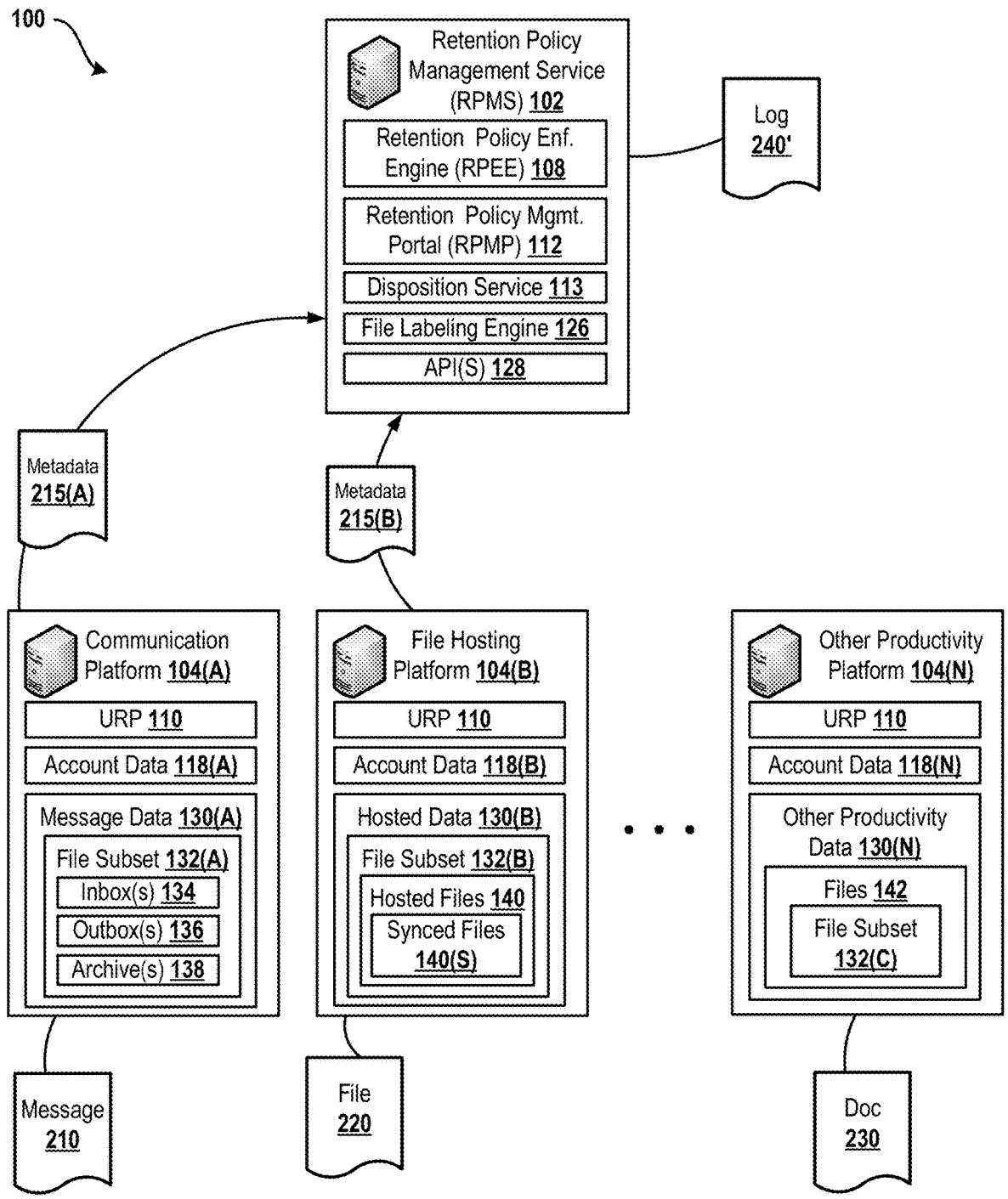
FIG. 4 illustrates an example data flow scenario of a system configured to implement an integrated retention policy in accordance with the present disclosure.

FIG. 3 illustrates productivity platform 104N sending, in response to poll 225 metadata 215N to retention policy management service 102. Retention policy management service 102 may store the metadata in log 240. Some applications and platforms may send data without receiving a poll from retention policy management service 102. FIG. 4 illustrates platforms 104A and 104B sending metadata 215A and 215B pertaining to message 210 associated with platform 104A and file 220 associated with platform 104B. Retention policy management service 102 may update log 240, which is shown as log 240' after including the information included in metadata 215A and 215B.

Figure 5:
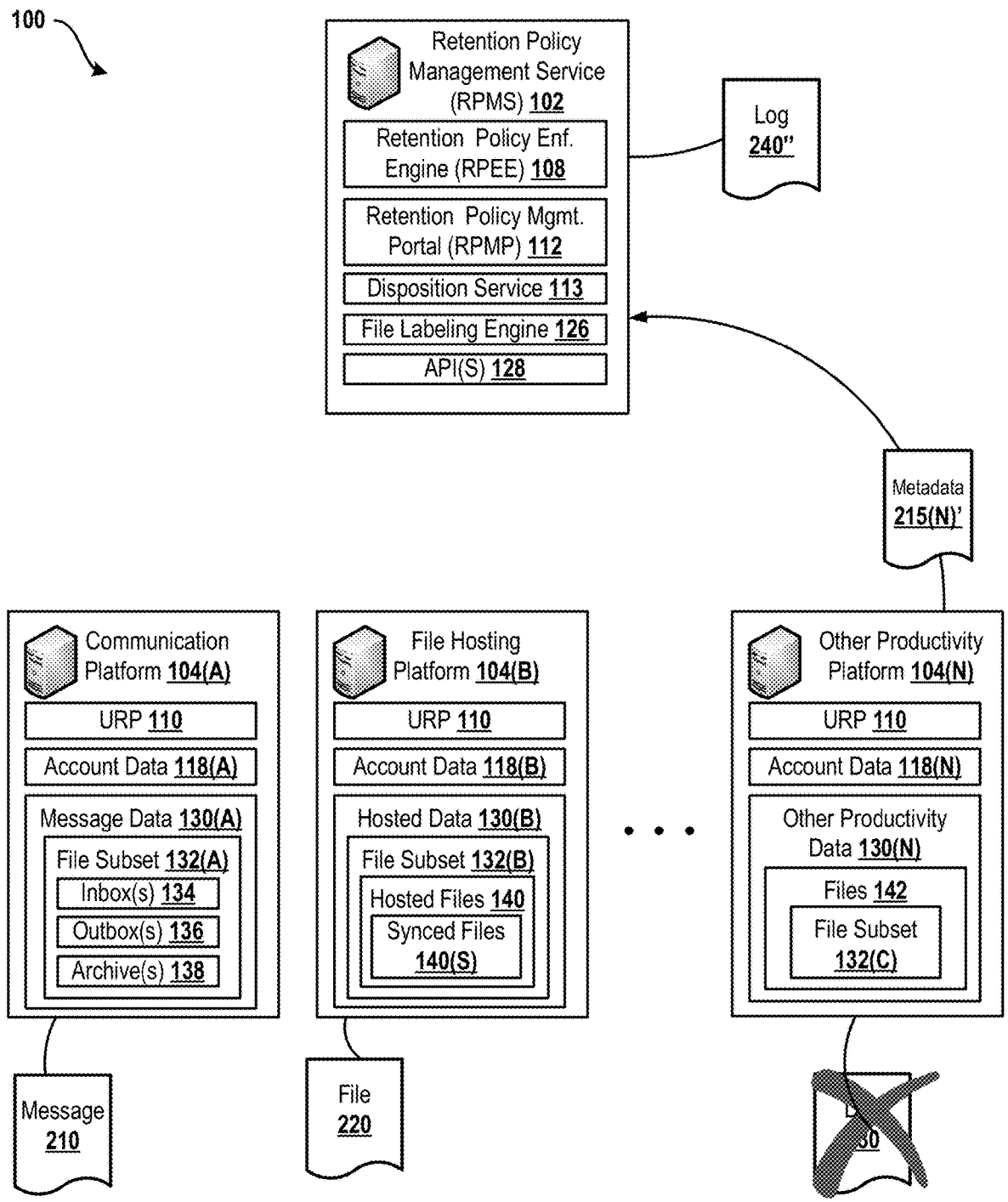
FIG. 5 illustrates an example data flow scenario of a system configured to implement an integrated retention policy in accordance with the present disclosure.

FIG. 5 illustrates further updates that may be sent to retention policy management service 102 when a document 230 is deleted. When retention policy management service 102 determines that a requested deletion of document 230 complies with data retention policies for document 230, then the deletion is allowed to proceed. The deletion may be confirmed by updated metadata 215' sent by platform 104N to retention policy management service 102, which may then update log 240', the updated log shown as log 240".

Figure 6:
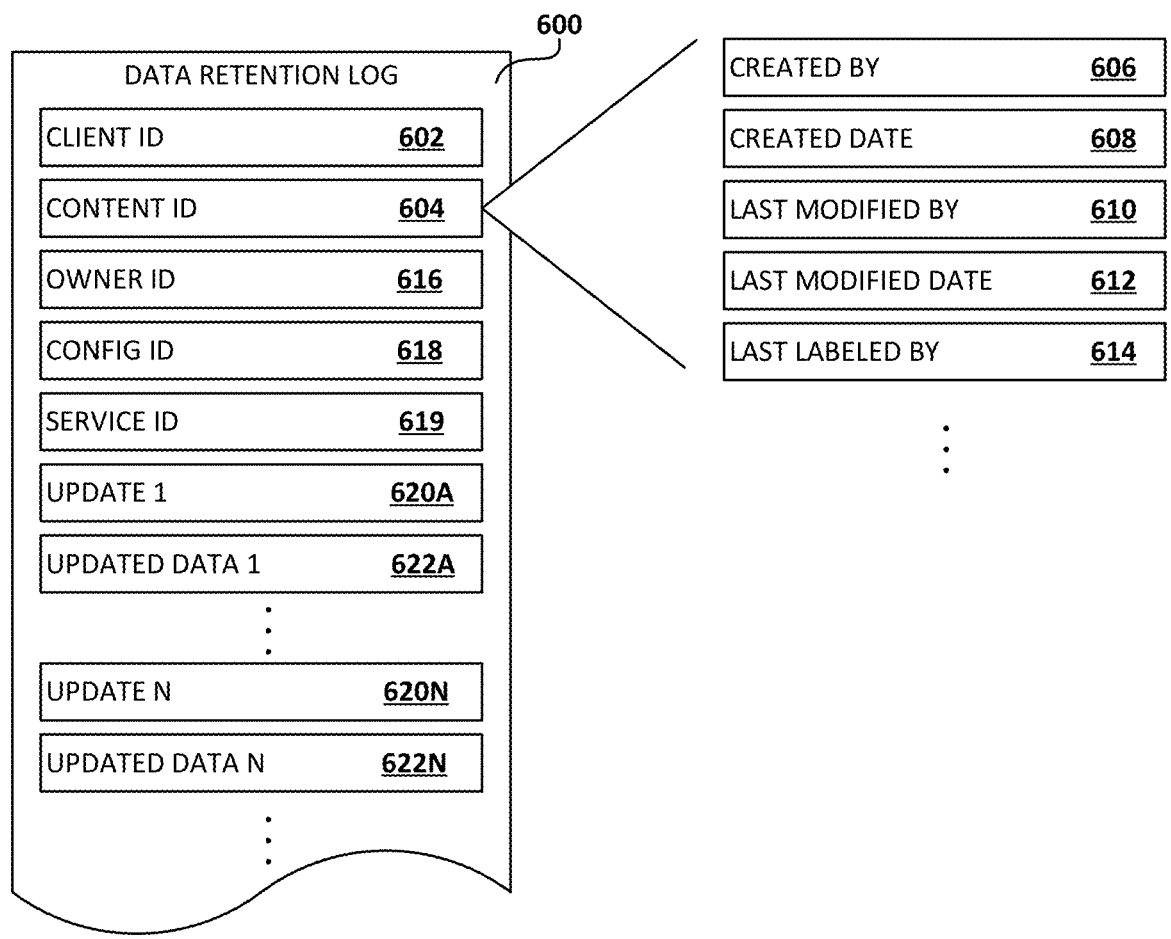
FIG. 6 illustrates an example data structure in accordance with the present disclosure.

FIG. 6 is a data structure diagram showing a number of data elements stored in a data retention record 600 a metadata stored for a content item such as a document. It will be appreciated by one skilled in the art that the data structure shown in the figure may represent a data file, a database table, an object stored in a computer memory, a programmatic structure or any other data container commonly known in the art. Each data element included in the data structure may represent one or more fields in a data file, one or more columns of a database table, one or more attributes of an object, one or more variables of a programmatic structure or any other unit of data of a data structure commonly known in the art.

Each data retention record 600 may contain a client ID 602 identifying the client of the retention policy management service 102 for whom the data retention record 600 is created. According to one embodiment, each data retention record 600 may also contain a content ID 604 identifying the content that may be associated with the content item. The content ID 604 may correspond to a unique identifier associated with the content item stored in the productivity platform 104N, for example. In one embodiment, each content item of each platform 104 may have an associated data retention record 600, which may be stored in a database communicatively coupled to the retention policy management service 102.

In some embodiments, the data retention record 600 may additionally or alternatively contain various metadata describing the associated content ID 604, including created by 606, created date 608, last modified by 610, last modified date 612, last labeled by 614, and the like. The data retention record 600 may also contain an owner ID 616 indicating an identification of a particular user associated with the record. The owner ID 616 may correspond to the identifier information provided by a user when signing up for services by the retention policy management service 102.

The data retention record 600 may also contain information regarding a configuration ID 618, corresponding to a particular configuration of the platforms 104, and service ID 619 that corresponds to identification of a service level agreement. The data retention record 600 may further contain information regarding one or more revision records 620A-620N (also referred to herein generally as "history 620") and revision content records 622A-622N (also referred to herein generally as "revision content 622"). The revision records 620A-620N may include deletion information such as whether the deletion of the content was allowed or denied, and the source of the deletion request. As further discussed, a user may access contents of data retention record 600 via a user interface or other means. It will be appreciated that the data retention record 600 may contain additional data elements beyond those shown in FIG. 6 and described above that are utilized by the retention policy management service 102, the disposition service 113 and/or other systems and services.

Figure 7:
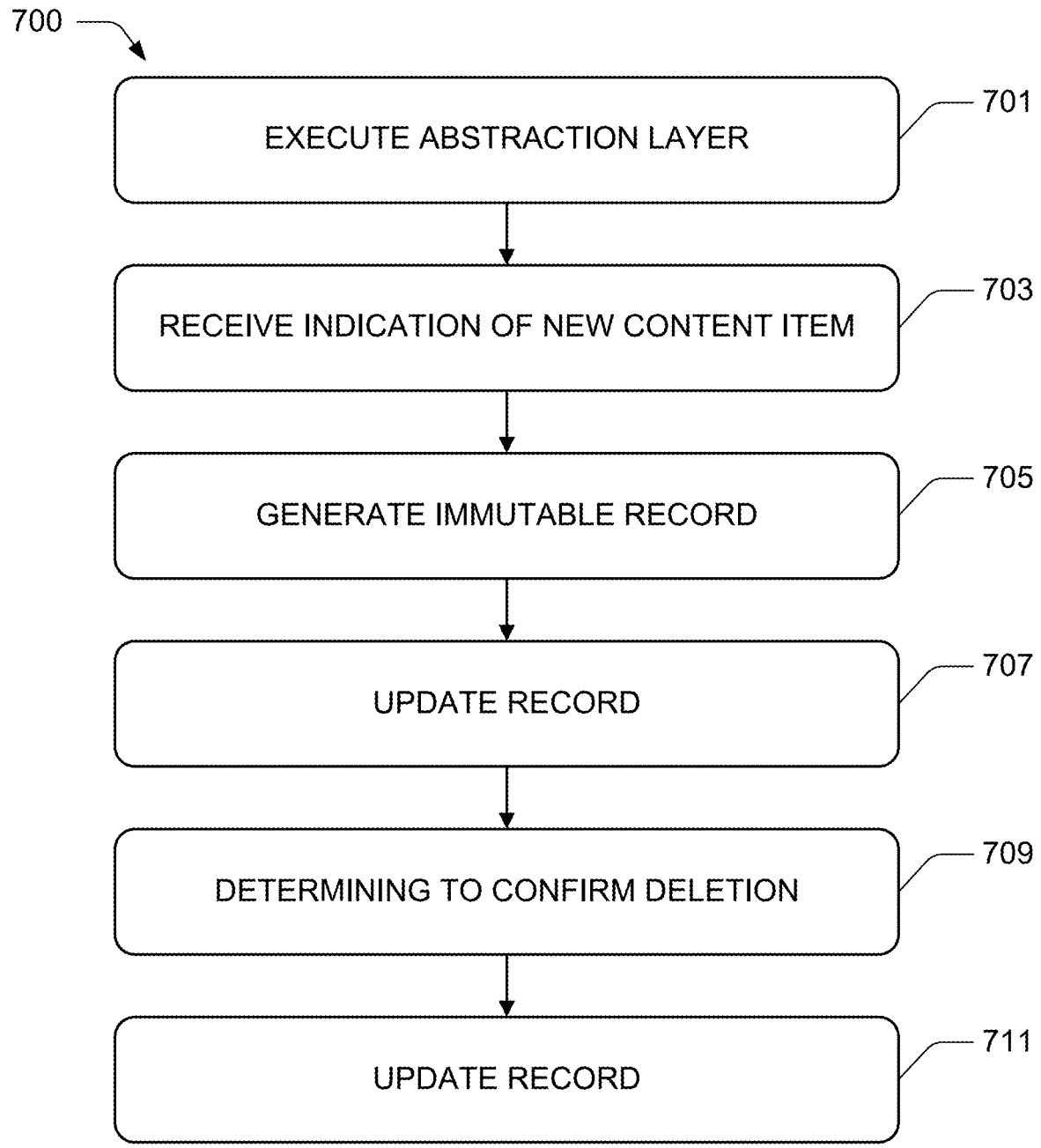
FIG. 7 is a flow diagram of an illustrative process for managing data in accordance with the present disclosure.

Turning now to FIG. 7, illustrated is an example operational procedure for managing data in accordance with the present disclosure. In an embodiment, the example operational procedure may implement a method executing on one or more computing devices. Such an operational procedure may provide for logging disposition data and can be provided by services such as the disposition service 113 in FIG. 1A.

Referring to FIG. 7, operation 701 illustrates executing an abstraction layer operable to communicate with a plurality of applications executing on a multi-application platform. In an embodiment, the abstraction layer may be configured to expose a standard interface for the plurality of applications to communicate content status information. Operation 701 may be followed by operation 703. Operation 703 illustrates receiving, from one of the plurality of applications via the standard interface, an indication that a new content item will be generated. In some embodiments, the standard interface may be implemented as a user interface such as a programming interface, and may be operable to receive first electronic messages that indicate a request for status updates pertaining to the content item; and in response to receiving one of the first electronic messages, sending second electronic messages indicative of metadata and attributes associated with retention of the content item.

Operation 703 may be followed by operation 705. Operation 705 illustrates in response to the indication, generating a record that is immutably associated with the new content item. In some configurations, a record that is immutably associated with a content item, such as a new content item, is protected by a system that prevents any user from making changes to the record. In some configurations, permissions granted to one or more users only allow information to be added to the record but under no circumstance can the one or more users delete the record. In some configurations, any data that is referred to herein as immutable cannot be deleted by any user including an administrator. In some configurations, permissions can allow users to add attributes, such as dates and associated tasks in a record, but once those attributes are added, those attributes cannot be modified or deleted. The associated tasks can describe any type of computer action such as a task of deleting a file, moving a file, etc.

Operation 705 may be followed by operation 707. Operation 707 illustrates updating the record with information received from the application associated with the content item. In an embodiment, the information pertains to a changed status of the content item. In some embodiments, updating the record comprises receiving updates from the application as status of the content item changes. The information may comprise attributes comprising one or more of: created by, created date, last modified by, last modified date, last labelled by, last labelled date, last label definition, is record, retention policy definition, and case-based holds.

Operation 707 may be followed by operation 709. Operation 709 illustrates in response to a command to delete the content item, determining whether to confirm deletion of the content item based on one or more data retention policies. Operation 709 may be followed by operation 711. Operation 707 illustrates updating the record to indicate a reason for the deletion and a source of the delete command when it is determined that the delete command is valid. Operation 711 may be followed by operation 713. Operation 713 illustrates updating the record to indicate a reason for denying the deletion and the source of the delete command when it is determined that the delete command is not valid. In an embodiment, the reason for denying the deletion includes the content item being associated with a case-based hold.

In some embodiments, data usable to render a display indicative of the record sending may be sent via a programming interface. Additionally, records may be generated for all content items generated by the plurality of applications while executing on the multi-application platform.

Figure 8:
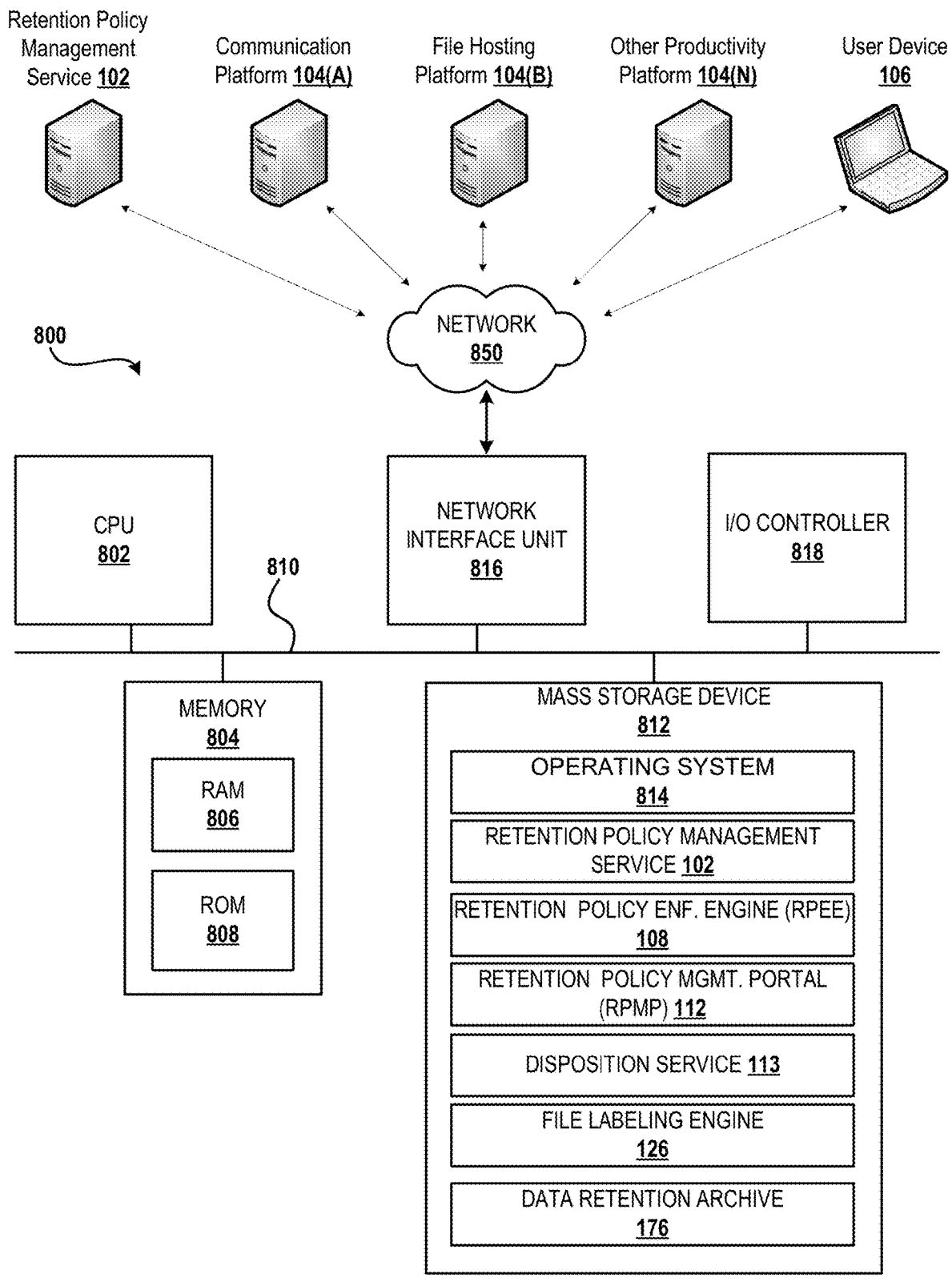
FIG. 8 shows additional details of an example computer architecture for a computer capable of executing a retention policy management service, a productivity platform, and/or or program components thereof as described herein.

FIG. 8 shows additional details of an example computer architecture 800 for a computer capable of executing the retention policy management service 102, the communication platform 104(A), the file hosting platform 104(B), the other productivity platform 104(N), and/or any program components thereof as described herein. Thus, the computer architecture 800 illustrated in FIG. 8 illustrates an architecture for a server computer, or network of server computers, or any other types of computing devices suitable for implementing the functionality described herein. The computer architecture 800 may be utilized to execute any aspects of the software components presented herein.

The computer architecture 800 illustrated in FIG. 8 includes a central processing unit 802 ("CPU"), a system memory 804, including a random-access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 814, other data, and one or more application programs. The mass storage device 812 may further include one or more of the retention policy management service 102, the retention policy enforcement engine (RPEE) 108, the retention policy management portal (RPMP) 112, disposition platform 113, the file labeling engine 126, and/or the data retention archive 176.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes of the claims, the phrase "computer storage medium," "computer-readable storage medium" and variations thereof, does not include waves, signals, and/or other transitory and/or intangible communication media, per se.

According to various techniques, the computer architecture 800 may operate in a networked environment using logical connections to remote computers through a network 850 and/or another network (not shown). The computer architecture 800 may connect to the network 850 through a network interface unit 816 connected to the bus 810. It should be appreciated that the network interface unit 816 also may be utilized to connect to other types of networks and remote computer systems. The computer architecture 800 also may include an input/output controller 818 for receiving and processing input from a number of other devices, including a keyboard, mouse, or electronic stylus (not shown in FIG. 8). Similarly, the input/output controller 818 may provide output to a display screen, a printer, or other type of output device (also not shown in FIG. 8). It should also be appreciated that via a connection to the network 850 through a network interface unit 816, the computing architecture may enable the retention policy management service 102 to communicate with one or more of the productivity platforms 104 and/or the user device 106.

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

The disclosure presented herein may be considered in view of the following clauses.

EXAMPLE CLAUSES

The disclosure presented herein may be considered in view of the following clauses.

Example Clause A, a computer-implemented method, comprising:

executing an abstraction layer operable to communicate with a plurality of applications executing on a multi-application platform, the abstraction layer configured to expose a standard interface for the plurality of applications to communicate content status information;

receiving, from one of the plurality of applications via the standard interface, an indication that a new content item will be generated;

in response to the indication, generating a record that is immutably associated with the new content item;

updating the record with information received from the application associated with the content item, the information pertaining to a changed status of the content item;

in response to a command to delete the content item, determining whether to confirm deletion of the content item based on one or more data retention policies;

updating the record to indicate a reason for the deletion and a source of the delete command when it is determined that the delete command is valid; and updating the record to indicate a reason for denying the deletion and the source of the delete command when it is determined that the delete command is not valid.

Example Clause B, the computer-implemented method of Example Clause A, wherein updating the record with information comprises receiving updates from the application as status of the content item changes.

Example Clause C, the computer-implemented method of any one of Example Clauses A through B, further comprising sending, via a programming interface, data usable to authenticate a user and render a display indicative of the record when the user is authenticated.

Example Clause D, the computer-implemented method of any one of Example Clauses A through C, wherein the information comprises attributes comprising one or more of: created by, created date, last modified by, last modified date, last labelled by, last labelled date, last label definition, is record, retention policy definition, and case-based holds.

Example Clause E, the computer-implemented method of any one of Example Clauses A through D, wherein the reason for denying the deletion includes the content item being associated with a case-based hold.

Example Clause F, the computer-implemented method of any one of Example Clauses A through E, wherein the standard interface is operable to:

receive first electronic messages that indicate a request for status updates pertaining to the content item; and in response to receiving one of the first electronic messages, sending second electronic messages indicative of metadata and attributes associated with retention of the content item.

Example Clause G, the computer-implemented method of any one of Example Clauses A through F, further comprising generating records for all content items generated by the plurality of applications while executing on the multi-application platform.

While Example Clauses A through G are described above with respect to a method, it is understood in the context of this document that the subject matter of Example Clauses A through G can also be implemented by a device, by a system, and/or via computer-readable storage media.

Example Clause H, a system comprising: at least one processor; and at least one memory in communication with the at least one processor, the at least one memory having computer-readable instructions stored thereupon that, when executed by the at least one processor, cause the system to:

receive, from a computing device, a request to define one or more filter parameters for activation of a file management label;

generate, based on the request, graphical user interface data usable to render a graphical user interface that includes at least one user interface element (UIE) operable to enable selection of a file retention period and a file purge age for the file management label;

instantiate an abstraction layer configured to present a standard interface for a plurality of applications to communicate file status information;

generate a record that is immutably attached to a file associated with the file management label, the file generated using one of the plurality of applications;

updating the record with information received via the standard interface from the application that created the file, the information pertaining to a changed status of the file;

in response to a command to delete the file, determining whether to confirm deletion of the file based on one or more data retention policies indicated by the file management label;

updating the record to indicate a reason for the deletion and a source of the delete command when the delete command is confirmed; and updating the record to indicate a reason for denying the deletion and the source of the delete command when it is determined that the delete command is not confirmed.

Example Clause I, the system of Example Clause H, wherein information comprises updates from the application as status of the file changes.

Example Clause J, the system of any one of Example Clauses H through I, further comprising computer-readable instructions stored thereupon that, when executed by the at least one processor, cause the system to: generate a second graphical user interface that authenticates a user and renders a display indicative of the information when the user is authenticated.

Example Clause K, the system of any one of Example Clauses H through J, wherein the information comprises attributes, the attributes being one or more of: created by, created date, last modified by, last modified date, last labelled by, last labelled date, last label definition, is record, retention policy definition, and case-based holds.

Example Clause L, the system of any one of Example Clauses H through K, wherein when the file is associated with a case-based hold, the file is not allowed to be deleted until the case-based hold is removed.

Example Clause M, the system of any one of Example Clauses H through L, wherein the standard interface is operable to receive first electronic messages that indicate a request for status updates pertaining to the file; and in response to receiving one of the electronic messages, send second electronic messages indicative of metadata and attributes associated with retention of the file.

Example Clause N, the system of any one of Example Clauses H through M, further comprising computer-readable instructions stored thereupon that, when executed by the at least one processor, cause the system to: generate records for all content items generated by the plurality of applications.

Example Clause O, the system of any one of Example Clauses H through N, wherein the computer-readable instructions further cause the system to: generate, on the second graphical user interface, a display indicative of information for a plurality of files associated with the plurality of applications.

While Example Clauses H through O are described above with respect to a system, it is understood in the context of this document that the subject matter of Example Clauses H through O can also be implemented by a device, via a computer-implemented method, and/or via computer-readable storage media.

Example Clause P, a computer-readable storage medium having computer-executable instructions stored thereupon which, when executed by one or more processors of one or more computing devices, cause the computing devices to:

receive a request to delete a content item from at least one storage device associated with at least one productivity platform;

in response to the request, deny the request when deletion of the content item violates a data retention policy for the content item;

in response to the request, granting the request when deletion of the content item is consistent with the data retention policy for the content item; and updating a record associated with the content item to indicate a reason for granting or denying the deletion and a source of the request, wherein the record is immutably associated with the content item.

Example Clause Q, wherein the data retention policy includes a file purge age.

Example Clause R, the computer-readable storage medium of any one of Example Clauses P through Q, further comprising computer-executable instructions which, when executed by the one or more processors of the one or more computing devices, cause the computing devices to:

instantiate an abstraction layer operable to communicate with a plurality of applications executing on the at least one productivity platform, the abstraction layer configured to present a standard interface for the plurality of applications to communicate content status information; and receive, from one of the plurality of applications via the abstraction layer, data indicative of creation or modification of the content item.

Example Clause S, the computer-readable storage medium of any one of Example Clauses P through R, wherein the computer-executable instructions cause the computing devices to update a plurality of records for a plurality of content items associated with a plurality of applications of the at least one productivity platform.

Example Clause T, the computer-readable storage medium of any one of Example Clauses P through S, wherein the standard interface is operable to receive content status information from newly installed software applications that communicate in accordance with the standard interface.

While Example Clauses P through T are described above with respect to a computer readable storage medium, it is understood in the context of this document that the subject matter of Example Clauses P through T can also be implemented by a device, by a system, and/or by a method.

Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Furthermore, as used in the claims, the term "at least one computing device" and the term "one or more computing devices" being used within a single claim is not to be construed as a single element. For example, a system may cause "at least one computing device" to perform some actions and "one or more computing devices" to perform other actions. In some implementations, the "at least one computing device" may share some of all of the individual devices with the "one or more computing devices." For example, the "at least one computing device" wholly or partially overlap with the "one or more computing devices." In some embodiments, no single computing device of the "at least one computing device" is shared with or otherwise common to the "one or more computing devices."

What is claimed is:

1. A computer-implemented method of managing data, comprising:

executing an interface operable to communicate with a plurality of applications executing on a multi-application platform, the interface configured to communicate content status information to the plurality of applications;

receiving, from one of the plurality of applications via the interface, an indication of a first new content item;

in response to the indication, generating a first record that is immutably associated with the first new content item;

updating the first record with first information pertaining to a changed status of the first new content item;

in response to a first command to delete the first new content item, deleting the first new content item based on a data retention policy; and updating the first record to indicate:
a reason for the deletion, and
a source of the first command.

2. The computer-implemented method of claim 1, further comprising:

receiving, via the interface, an indication of a second new content item;

in response to the indication of the second new content item, generating a second record that is immutably associated with the second new content item;

updating the second record with second information pertaining to a changed status of the second new content item;

in response to a second command to delete the second new content item, denying the second command based on the policy; and updating the second record to indicate:
a reason for the denying the second command, and
a source of the second command.

3. The computer-implemented method of claim 2, wherein the reason for denying the second command includes the second content item being associated with a case-based hold.

4. The computer-implemented method of claim 1, further updating the first record as status of the first content item changes.

5. The computer-implemented method of claim 1, further comprising sending, via a programming interface, data usable to authenticate a user and render a display indicative of the first record in response to authentication of the user.

6. The computer-implemented method of claim 1, wherein the first information comprises attributes indicative of: created by, created date, last modified by, last modified date, last labelled by, last labelled date, last label definition, is record, retention policy definition, or case-based holds.

7. The method of claim 1, wherein the interface is operable to:

receive first electronic messages that indicate a request for status updates pertaining to the first content item; and in response to receiving one of the first electronic messages, send second electronic messages indicative of metadata and attributes associated with retention of the first content item.

8. A system, comprising:
at least one processor; and
at least one memory in communication with the at least one processor, the at least one memory having computer-readable instructions stored thereupon that, when executed by the at least one processor, cause the system to:
receive, from a computing device, a request to define a filter parameter for activation of a file management label;
generate, based on the request, graphical user interface data usable to render a first graphical user interface that includes at least one user interface element (UIE) operable to enable selection of a file retention period and a file purge age for the file management label;
instantiate a standard interface operable to communicate file status information to a plurality of applications;
generate a record that is immutably associated with a file associated with the file management label, the file received from a first application;
update the record with information received via the standard interface from the first application, the information pertaining to a changed status of the file;
in response to a first command to delete the file, delete the file based on a data retention policy indicated by the file management label; and
update the record to indicate:
a reason for the deletion, and
a source of the first command.

9. The system of claim 8, further comprising computer-readable instructions stored thereupon that, when executed by the at least one processor, cause the system to:
in response to a second command to delete the file, deny the second command based on the data retention policy indicated by the file management label; and
update the record to indicate:
a reason for denying the second command, and
a source of the second command.

10. The system of claim 8, further comprising computer-readable instructions stored thereupon that, when executed by the at least one processor, cause the system to: update the record as status of the file changes.

11. The system of claim 8, further comprising computer-readable instructions stored thereupon that, when executed by the at least one processor, cause the system to: generate a second graphical user interface configured to authenticate a user and render a display indicative of the information in response to authentication of the user.

12. The system of claim 11, further comprising computer-readable instructions stored thereupon that, when executed by the at least one processor, cause the system to: generate, on the second graphical user interface, a display indicative of information for a plurality of files associated with the plurality of applications.

13. The system of claim 8, wherein the information comprises attributes indicative of: created by, created date, last modified by, last modified date, last labelled by, last labelled date, last label definition, is record, retention policy definition, or case-based holds.

14. The system of claim 8, wherein when the file is associated with a case-based hold, the file is not allowed to be deleted until the case-based hold is removed.

15. The system of claim 8, wherein the standard interface is operable to receive first electronic messages that indicate a request for status updates pertaining to the file; and in response to receiving one of the electronic messages, send second electronic messages indicative of metadata and attributes associated with retention of the file.

16. A computer-readable storage medium having computer-executable instructions stored thereupon which, when executed by a processor of a computing device, cause the computing device to:
instantiate a standard interface operable to communicate content status information for a plurality of applications executing on a productivity platform;
receive, via the standard interface, data indicative of creation or modification of a content item;
receive a first request to delete the content item from a storage device associated with the productivity platform;
in response to the request, deny the first request based on a data retention policy for the content item; and
update a record associated with the content item to indicate:
a reason for denying the first request, and
a source of the first request, wherein the record is immutably associated with the content item.

17. The computer-readable storage medium of claim 16, wherein the computer-executable instructions cause the computing devices to:
in response to a second request to delete the content item, delete the content item based on the data retention policy for the content item; and
update the record to indicate:
a reason for granting the second request, and
a source of the second request.

18. The computer-readable storage medium of claim 16, wherein the data retention policy includes a file purge age.

19. The computer-readable storage medium of claim 16, wherein the standard interface is operable to:
receive first electronic messages that indicate a request for status updates pertaining to the content item; and
in response to receiving one of the first electronic messages, send second electronic messages indicative of metadata and attributes associated with retention of the content item.

20. The computer-readable storage medium of claim 16, wherein the standard interface is operable to receive content status information from newly installed software applications that communicate in accordance with the standard interface.

* * * * *